US010237565B2

(12) United States Patent
Chen et al.

(10) Patent No.: US 10,237,565 B2
(45) Date of Patent: Mar. 19, 2019

(54) CODING PARAMETER SETS FOR VARIOUS DIMENSIONS IN VIDEO CODING

(75) Inventors: Ying Chen, San Diego, CA (US); Marta Karczewicz, San Diego, CA (US); Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1239 days.

(21) Appl. No.: 13/561,754

(22) Filed: Jul. 30, 2012

(65) Prior Publication Data

US 2013/0034170 A1 Feb. 7, 2013

Related U.S. Application Data

(60) Provisional application No. 61/513,996, filed on Aug. 1, 2011, provisional application No. 61/539,925, filed (Continued)

(51) Int. Cl.
*H04N 19/37* (2014.01)
*H04N 19/40* (2014.01)
(Continued)

(52) U.S. Cl.
CPC ............ *H04N 19/40* (2014.11); *H04N 13/00* (2013.01); *H04N 19/186* (2014.11);
(Continued)

(58) Field of Classification Search
CPC ........ H04N 19/40; H04N 19/70; H04N 19/37; H04N 19/186; H04N 19/39;
(Continued)

(56) References Cited

U.S. PATENT DOCUMENTS 7,302,490 B1 * 11/2007 Gupta ................ H04N 21/2335
709/231
8,149,923 B2 4/2012 Lim et al.
(Continued)

FOREIGN PATENT DOCUMENTS

CN 101390399 A 3/2009
CN 101449585 A 6/2009
(Continued)

OTHER PUBLICATIONS

Suh, "A Shortened NAL Header for Light Applications", Joint Video Team (JVT) of ISO/IEC MPEG & ITU-T VCEG (ISO/IEC JTC1/SC29/WG11 and ITU-T SG16 Q.6), 22nd Meeting: Marrakech, Morocco, Jan. 13-19, 2007, JVT-V129r1, 5 pp.
(Continued)

*Primary Examiner* — Tung T Vo
*Assistant Examiner* — Joseph W Becker
(74) *Attorney, Agent, or Firm* — Shumaker & Sieffert, P.A.

(57) ABSTRACT

In one example, a device for coding video data includes a video coder configured to code, for a bitstream, information representative of which of a plurality of video coding dimensions are enabled for the bitstream, and code values for each of the enabled video coding dimensions, without coding values for the video coding dimensions that are not enabled, in a network abstraction layer (NAL) unit header of a NAL unit comprising video data coded according to the values for each of the enabled video coding dimensions. In this manner, NAL unit headers may have variable lengths, while still providing information for scalable dimensions to which the NAL units correspond.

45 Claims, 8 Drawing Sheets

Related U.S. Application Data on Sep. 27, 2011, provisional application No. 61/557,300, filed on Nov. 8, 2011, provisional application No. 61/563,359, filed on Nov. 23, 2011.

(51) Int. Cl.
| | |
|---|---|
| *H04N 13/00* | (2018.01) |
| *H04N 21/2343* | (2011.01) |
| *H04N 19/70* | (2014.01) |
| *H04N 19/186* | (2014.01) |
| *H04N 19/39* | (2014.01) |
| H04N 13/161 | (2018.01) |

(52) U.S. Cl.
CPC ............. *H04N 19/37* (2014.11); *H04N 19/39* (2014.11); *H04N 19/70* (2014.11); *H04N 21/2343* (2013.01); *H04N 21/23439* (2013.01); *H04N 21/234309* (2013.01); *H04N 21/234354* (2013.01); *H04N 21/234363* (2013.01); *H04N 21/234381* (2013.01); *H04N 13/161* (2018.05)

(58) Field of Classification Search
CPC ........... H04N 21/234363; H04N 13/00; H04N 21/23439; H04N 21/234381; H04N 21/2343; H04N 21/234309; H04N 21/234354; H04N 13/0048

See application file for complete search history.

(56) References Cited

U.S. PATENT DOCUMENTS

| | | | |
|---|---|---|---|
| 8,594,203 B2 | 11/2013 | Ugur et al. | |
| 2005/0254575 A1 | 11/2005 | Hannuksela et al. | |
| 2007/0210549 A1 | 9/2007 | Westnedge | |
| 2007/0230564 A1 | 10/2007 | Chen et al. | |
| 2008/0253671 A1 | 10/2008 | Choi et al. | |
| 2009/0003431 A1 | 1/2009 | Zhu et al. | |
| 2009/0175334 A1 | 7/2009 | Ye et al. | |
| 2009/0175353 A1 | 7/2009 | Suh et al. | |
| 2009/0187960 A1 | 7/2009 | Lee et al. | |
| 2010/0150224 A1 | 6/2010 | Pateux et al. | |
| 2010/0158133 A1 | 6/2010 | Yin et al. | |
| 2010/0189182 A1* | 7/2010 | Hannuksela ... | H04N 21/234327 375/240.25 |
| 2010/0260260 A1 | 10/2010 | Wiegand et al. | |
| 2010/0266042 A1 | 10/2010 | Koo et al. | |
| 2010/0316134 A1 | 12/2010 | Chen et al. | |
| 2011/0032917 A1 | 2/2011 | Lamy-Bergot et al. | |
| 2011/0149037 A1 | 6/2011 | Van Der Horst et al. | |
| 2011/0221861 A1 | 9/2011 | Jeon et al. | |
| 2012/0057635 A1* | 3/2012 | Rusert ............ | H04N 21/234309 375/240.16 |
| 2012/0081241 A1* | 4/2012 | Misra ................. | H03M 7/4093 341/107 |
| 2013/0114670 A1 | 5/2013 | Chen et al. | |

FOREIGN PATENT DOCUMENTS

| | | |
|---|---|---|
| CN | 101627634 A | 1/2010 |
| RU | 2387094 C1 | 4/2010 |
| WO | WO02054779 A2 | 7/2002 |
| WO | 2007114608 A1 | 10/2007 |
| WO | 2008056959 A1 | 5/2008 |
| WO | 2008085013 A1 | 7/2008 |
| WO | 2010086501 A1 | 8/2010 |
| WO | 2010102650 A1 | 9/2010 |
| WO | 2010126612 A2 | 11/2010 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Boyce et al.,"High level syntax hooks for future extensions," 8th Meeting, MPEG Meeting; Feb. 1-10, 2012, San Jose, CA ; (Motion Picture Expert Group or ISO/IEC JTC1/SC29/WG11), No. m23263, XP030051788, 8 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, CH, Nov. 21-30, 2011, JCTVC-G1103_d2, 214 pp.
Chen et al., "Description of 3D Video Coding Technology Proposal by Qualcomm Incorporated", MPEG Meeting; Nov. 28, 2011-Dec. 2, 2011; Geneva, CH; (Motion Picture Expert Group or ISO/IEC JTC1/SC29/WG11), No. m22583, XP030051146, 21 pp.
Chen et al.,"3D-HEVC HLS: Parameter sets for 3DV", MPEG Meeting; Apr. 30, 2012-May 4, 2012; Geneva, CH; (Motion Picture Expert Group or ISO/IEC JTC1/SC29/WG11), No. m24945, XP030053288, 9 pp.
Chen et al.,"AHG 17: Unified NAL unit header design for HEVC and its extensions," JCT-VC Meeting; MPEG Meeting; Nov. 21, 2011-Nov. 30, 2011; Geneva, CH; (Joint Collaborative Team on Video Coding of ISO/IEC JTC1/SC2/WG11 and ITU-TSG. 16 ); URL: http://wftp3.itu.int/av-arch/jctvc-site/, No. JCTVC-G336, XP030110320, 8 pp.
Hannuksela et al.,"Scalable multiview video coding", JVT Meeting; Apr. 24-29, 2008, (Joint Video Team of ISO/IEC JTC1/SC29/WG11 and ITU-TSG. 16 ), No. JVT-AA044-L, XP030007387, ISSN: 0000-0091, 6 pp.
International Search Report and Written Opinion—PCT/US2012/049041—ISA/EPO—dated Nov. 7, 2012, 17 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Skupin et al.,"Generic HEVC high level syntax for scalability and adaptation", 9th Meeting, JCT-VC Meeting; MPEG Meeting; Apr. 27, 2012-May 7, 2012; Geneva, CH; (Joint Collaborative Team on Video Coding of ITU-TSG 16 WP3 and ISO/IEC JTC1/SC29/WG11); URL: http:// wftp3.itu.int/av-arch/jctvc-site/, No. JCTVC-I0217, XP030111980, 6 pp.
Suh et al.,"A Shortened NAL Header for Light Applications," JVT Meeting; MPEG Meeting; Jan. 13-19, 2007; Marrakech, Morocco, (Joint Video Team of ISO/IEC JTC1/SC29/WG11 and ITU-T SG. 16), No. JVT-V129, XP030006937, ISSN: 0000-0156, 8 pp.
Vetro et al.,"Joint Draft 6.0 on Multiview Video Coding," JVT Meeting; MPEG Meeting; Jan. 13-18, 2008; Antalya, Turkey; (Joint Video Team of ISO/IEC JTCI/SC29/WG11 and ITU-T SG.16 ), No. JVT-Z209, XP030007344, ISSN: 0000-0065, 41 pp.
Wiegand et al., "WD1: Working Draft 1 of High-Efficiency Video Coding," JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "High Efficiency Video Coding (HEVC) text specification draft 9," 11th Meeting: Shanghai, CN, Oct. 10-19, 2012, JCTVC-K1003_v7, 290 pp.

(56) References Cited

OTHER PUBLICATIONS

Bross et al., "High Efficiency Video Coding (HEVC) text specification draft 10 (for FDIS & Last Call)," 12th Meeting: Geneva, CH, Jan. 14-23, 2013, JCTVC-L1003_v34, 310 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Response to Written Opinion dated Nov. 7, 2012, from International Application No. PCT/US2012/049041, filed on Feb. 6, 2013, 10 pp.
Second Written Opinion from International Application No. PCT/US2012/049041, dated Aug. 5, 2013, 9 pp.
Response to Second Written Opinion dated Aug. 5, 2013, from International Application No. PCT/US2012/049041, filed on Sep. 25, 2013, 6 pp.
International Preliminary Report on Patentability from International Application No. PCT/US2012/049041, dated Dec. 6, 2013, 11 pp.
Boyce et al., "Extensible High Layer Syntax for Scalability," MPEG Meeting; Mar. 16-23, 2011; Geneva, CH; (Motion Picture Expert Group or ISO/IEC JTC1/SC29/WG11), No. m19806, XP030048373, 10 pp.
Sjoberg, "On num_reorder frames and max_dec_frame_buffering," JCT-VC Meeting; MPEG Meeting; Mar. 16-23, 2011; Geneva, CH; (Joint Collaborative Team on Video Coding of ITU-T SG16 WP3 and ISO/IEC JTC1/SC29/WG11); URL: http://wftp3.itu.int/av-arch/jctvc-site/, No. JCTVC-E339, XP030008845, ISSN: 0000-0005, 4 pp.
Bross et al., "WD4: Working Draft 4 of High-Efficiency Video Coding," JCTVC-F803, ISO/IEC/ITU-T Joint Collaborative Team on Video Coding, Turin, Italy (Jul. 2011).
JVT-AD007, "Editor's draft revision to ITU-T Rec. H.264, ISO/IEC 14496-10 Advanced Video Coding—in preparation for ITU-T SG 16 AAP Consent (in integrated form)," 30th JVT meeting, Geneva, CH, Feb. 2009, available http://wftp3.itu.int/av-arch/jvt-site/2009_01_Geneva/JVT-AD007.zip.
Rusert, et al., "High level syntax for scalability support in HEVC," Joint Collaborative Team on Video Coding (JCT-VC) of ITU-T SG13 WP3 and ISO/IEC JTC1/SC29/WG11, Document No. JCTVC-F491, Jul. 21, 2011, 9 pp.
Wang, et al., "On NAL Unit Types and Slice Types", Joint Collaborative Team on Video Coding (JCT-VC) of ITU-T SG16 WP3 and ISO/IEC JTC1/SC29/WG11, JCTVC-G331, Nov. 21-30, 2011 7th Meeting: Geneva, CH, Feb. 19, 2016, 7 pp.

Hannuksela, et al., "Scalable Multiview Video Coding (SMVC)", Joint Video Team (JVT) of ISO/IEC MPEG & ITU-T VCEG (ISO/IEC JTC1/SC29/WG11 and ITU-T SG16 Q.6) 27th Meeting: Geneva, CH, Apr. 24-29, 2008 JVT-AA044_L, published on Apr. 24, 2008, 6 pp.
Suh D.Y., "A Shortened NAL Header for Light Applications", Joint Video Team (JVT) of ISO/IEC MPEG & ITU-T VCEG (ISO/IEC JTC1/SC29/WG11 and ITU-T SG16 Q.6), 22nd Meeting: Marrakech, Morocco, Jan. 2007, JVT-V129r1, pp. 1-5.
Amon, et al., "High-Level Syntax for SVC," Joint Video Team (JVT) of ISO/IEC MPEG & ITU-T VCEG (ISO/IEC JTC1/SC29/WG11 and ITU-T SG16 Q.6), Document: JCT-P100, Jul. 24-29, 2005, 10 pp.
Chen, et al.,"AHG 17: Unified NAL unit header design for HEVC and its extensions", JCT-VC Meeting; MPEG Meeting; Nov. 21-30, 2011; Geneva; (Joint Collaborative Team on Video Coding of ISO/IEC JTC1/SC29/WG11 and ITU-TSG. 16 ); URL: http://wftp3.itu.int/av-arch/jctvc-site/, No. JCTVC-G336, XP030110320, 7 pp.
Wang, et al., "On NAL unit header," (Joint Collaborative Team on Video Coding of ISO/IEC JTC1/SC29/WG11), Jan. 20-28, 2011, Document: JCTVC-D080, 3 pp.
Wang, et al., "NAL unit header and sub-bitstream extraction," (Joint Collaborative Team on Video Coding of ISO/IEC JTC1/SC29/WG11), Mar. 16-23, 2011, Document: JCTVC-E345, 5 pp.
Sjoberg, et al., "NAL unit header concept with support for bit stream scalability," (Joint Collaborative Team on Video Coding of ISO/IEC JTC1/SC29/WG11), Mar. 16-23, 2011, Document: JCTVC-E422, 6 pp.
Rusanovskyy, et al., "Common Test Conditions of 3DV Core Experiments," Jul. 16-20, 2012; ITU-T SG 16 WP 3 and ISO/IEC JTC 1/SC 29/WG 11, JCT3V-A1100 (JCT2-A1100), 1st Meeting: Stockholm, SE, Jul. 20, 2012, 2012, 5 pp.
Tech, et al., "MV-HEVC Working Draft 1," Jul. 16-20, 2012; Joint Collaborative Team on 3D Video Coding Extension Development of ITU-T SG 16 WP 3 and ISO/IEC JTC 1/SC 291WG 11 1st Meeting: Stockholm, SE, Aug. 21, 2012, Document JCT3V-A1004_d0, 20 pp.
Zhang, et al., "AHG5: MV-HEVC software for HTM," Oct. 13-19, 2012; ITU-T SG 16 WP 3 and ISO/IEC JTC 1/SC 29/WG 11, JCT3V-B0046, 2nd Meeting: Shanghai, CN, Oct. 18, 2012, 5 pp.
Examination and Search Report of corresponding Canadian Application No. 2,843,748, Canadian Intellectual Patent Office, dated Jun. 22, 2016, 5 pp.

* cited by examiner

CODING PARAMETER SETS FOR VARIOUS DIMENSIONS IN VIDEO CODING

This application claims the benefit of U.S. Provisional Application Nos. 61/513,996, filed Aug. 1, 2011, 61/539,925, filed Sep. 27, 2011, 61/557,300, filed Nov. 8, 2011, and 61/563,359, filed Nov. 23, 2011 each of which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for signaling characteristics of various scalable dimensions of video data. Video data may be scaled in various different dimensions, such as spatial resolution, frame rate (temporal), views (e.g., to support three-dimensional (3D) video playback), color bit depth, chroma sampling format, quality, or other such dimensions. In general, a scalable dimension of video data may include one or more elements. For example, a view dimension may include a single view for two-dimensional video, two views for stereo video, or N views (where N is an integer greater than two) for multiview. As another example, a temporal dimension may include a first layer of pictures for supporting a base frame rate (e.g., 15 frames per second (fps)), and one or more higher layers for supporting higher frame rates (e.g., 30 fps, 60 fps, and 120 fps). The techniques of this disclosure generally relate to signaling whether a bitstream, or sub-bitstream thereof, includes multiple layers for a particular dimension, and if so, values of characteristics for that dimension, e.g., in a network abstraction layer (NAL) unit header, which may include coding a number of bits for each of the values of the various dimensions. In this manner, the techniques of this disclosure may enable, instead of always using fixed-length values for each syntax element related to one scalable dimension in the NAL unit header, allocating the length of each the syntax element based on information that may change for different coded video sequence of a bitstream and information that does not change within a coded video sequence of a bitstream.

In one example, a method of coding video data includes coding, for a bitstream, information representative of which of a plurality of video coding dimensions are enabled for the bitstream, and coding values for syntax elements representative of the enabled video coding dimensions, without coding values for syntax elements representative of the video coding dimensions that are not enabled, in a network abstraction layer (NAL) unit header of a NAL unit comprising video data coded according to the values for each of the enabled video coding dimensions.

In another example, a device for coding video data includes a video coder configured to code, for a bitstream, information representative of which of a plurality of video coding dimensions are enabled for the bitstream, and code values for syntax elements representative of the enabled video coding dimensions, without coding values for syntax elements representative of the video coding dimensions that are not enabled, in a network abstraction layer (NAL) unit header of a NAL unit comprising video data coded according to the values for each of the enabled video coding dimensions.

In another example, a device for coding video data includes means for coding, for a bitstream, information representative of which of a plurality of video coding dimensions are enabled for the bitstream, and means for coding values for syntax elements representative of the enabled video coding dimensions, without coding values for syntax elements representative of the video coding dimensions that are not enabled, in a network abstraction layer (NAL) unit header of a NAL unit comprising video data coded according to the values for each of the enabled video coding dimensions.

In another example, a computer-readable storage medium is encoded with instructions that, when executed, cause a processor to code, for a bitstream, information representative of which of a plurality of video coding dimensions are enabled for the bitstream, and code values for syntax elements representative of the enabled video coding dimensions, without coding values for syntax elements representative of the video coding dimensions that are not enabled, in a network abstraction layer (NAL) unit header of a NAL unit comprising video data coded according to the values for each of the enabled video coding dimensions.

The details of one or more examples are set forth in the accompanying drawings and the description below. Other features, objects, and advantages will be apparent from the description and drawings, and from the claims.

DETAILED DESCRIPTION

Figure 1:
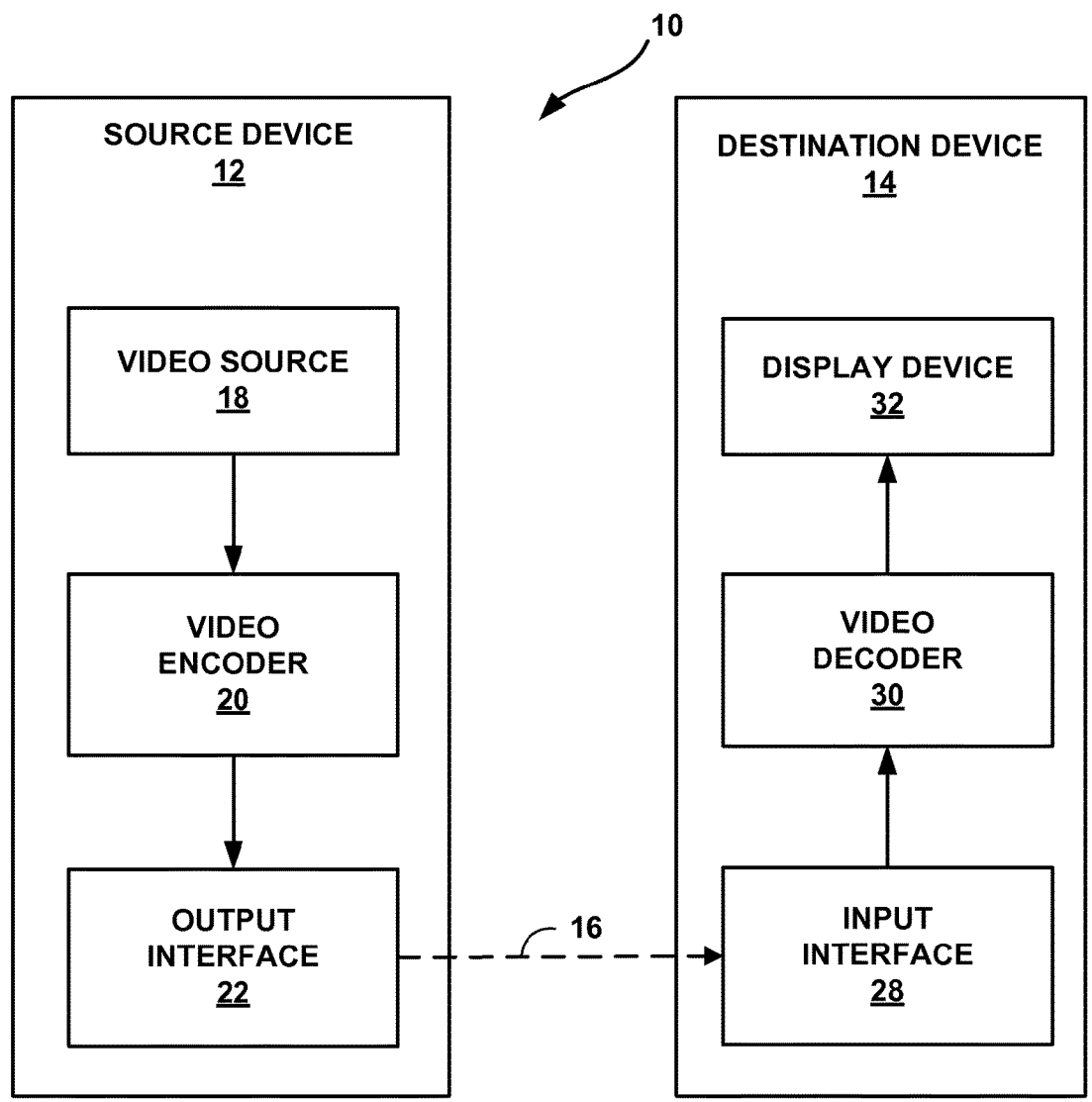
FIG. 1 is a block diagram illustrating an example video encoding and decoding system that may utilize techniques for signaling characteristics of scalable dimensions for video data.

In general, this disclosure describes techniques for signaling characteristics of various dimensions of video data. The dimensions may be referred to herein as video coding dimensions, or simply "dimensions" for brevity. Video data may be scaled in various different dimensions, such as spatial resolution, frame rate (temporal), views (e.g., to support three-dimensional (3D) video playback), color bit depth, chroma sampling format, quality, or other such dimensions. Thus, the video coding dimensions may also be referred to as "scalable video coding dimensions" or simply "scalable dimensions."

A scalable dimension of video data may include one or more elements. For example, a view dimension may include a single view for two-dimensional video, two views for stereo video, or N views (where N is an integer greater than two) for multiview. As another example, a temporal dimension may include a first layer of pictures for supporting a base frame rate (e.g., 15 frames per second (fps)), and one or more higher layers for supporting higher frame rates (e.g., 30 fps, 60 fps, and 120 fps). The techniques of this disclosure generally relate to signaling whether a bitstream, or sub-bitstream thereof, includes multiple elements (e.g., multiple layers) for a particular dimension, and if so, values of characteristics for that dimension, e.g., in a network abstraction layer (NAL) unit header.

The techniques of this disclosure may be implemented with respect to various audio, video, or other media coding standards. For purposes of example, the techniques of this disclosure are discussed with respect to the techniques of the upcoming High Efficiency Video Coding (HEVC) standard. However, it should be understood that these techniques may be implemented for other coding standards as well. A recent draft of the upcoming HEVC standard, referred to as HEVC Working Draft 7, or WD7, is described in document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012, which, as of Jul. 30, 2012, is downloadable from http://phenix.it-sudparis.eu/jct/doc_end_user/documents/9_Geneva/wg11/JCTVC-I1003-v9.zip. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC). Video coding standards may also be extended using various extensions. For example, ITU-T H.264/AVC includes a scalable video coding (SVC) extension and a multiview video coding (MVC) extension.

As noted above, the techniques of this disclosure may be used to signal characteristics of various scalable dimensions in NAL unit headers. A NAL unit generally encapsulates lower-layer data, such as video coding layer (VCL) data or non-VCL data. VCL data generally includes coded video data that is encoded by a video encoder and decoded by a video decoder. Non-VCL data may include signaling data that is not necessary for decoding, but may be useful to a destination device. For example, non-VCL data may include supplemental enhancement information (SEI) messages.

For purposes of comparison, a NAL unit header in the MVC extension of ITU-T H.264/AVC (also referred to herein as "H.264/AVC") contains a one byte NAL unit header, including the NAL unit type and a nal_ref_idc syntax element. In addition, the MVC NAL unit header may include an MVC NAL unit header extension, if the NAL unit type is a prefix NAL unit or a normal MVC NAL unit. The NAL unit header extension of MVC contains the following syntax elements: nor_idr_flag to indicate whether the NAL unit belongs to an IDR/V-IDR picture that can be used for closed-GOP random access point; priority_id that can be used for single-pass adaptation; view_id to indicate the view identifier of the current belonging view; temporal_id to indicate the temporal level of the current NAL unit; anchor_pic_flag to indicate whether the NAL unit belongs to an anchor picture that can be used for open-GOP random access point; and inter_view_flag to indicate whether is used for inter-view prediction for NAL units in other views. A prefix NAL unit in MVC contains a NAL unit header and its MVC NAL unit header extension.

Again for purposes of comparison, a NAL unit header in the SVC extension of H.264/AVC may include syntax elements that are added in the NAL unit header extension, which extends the conventional one-byte NAL unit header of H.264/AVC to four bytes, to describe the characteristics of a VCL NAL unit in multiple dimensions, including priority_id, temporal_id, dependency_id, and quality_id. In the SVC extension of H.264/AVC, dependency_id is related to spatial scalability, or Coarse Grain Scalable (CGS), and quality_id indicates the signal to noise ratio (SNR)/quality scalability. Priority_id is related to a priority identifier for the corresponding NAL unit, and temporal_id specifies a temporal identifier for the corresponding NAL unit (which may be used to support temporal scalability, e.g., varying frame rates).

Yet again for purposes of comparison, a VCL NAL unit in HEVC includes a longer NAL unit header than the NAL unit header in H.264/AVC, but the first byte in the HEVC WD7 NAL unit header is currently the same as the NAL unit header in H.264/AVC. The HEVC WD7 NAL unit header also contains temporal_id and output_flag syntax elements.

As shown above, the various NAL unit headers of H.264/AVC, SVC, MVC, and HEVC include different sets of syntax elements for supporting different scalable dimensions. HEVC may ultimately be configured to support multiple different scalable dimensions, such as the dimensions of the SVC and MVC extensions of H.264/AVC. This disclosure recognizes that various problems may arise when attempting to support different HEVC extensions for various scalable dimensions. For example, in different extensions, different types of NAL unit header extensions may be required. By providing various different types of NAL unit header extensions, the ultimate specification of HEVC may end up having either multiple NAL unit header extension syntax tables, which may increase complexity for devices related to processing video data.

Alternatively, the ultimate specification of HEVC may specify a NAL unit header having a maximum number of bits to support all possible syntax elements. If the NAL unit header has a unique, fixed-length design, a lot of the syntax elements may be set to default values (e.g., 0), and only several of the syntax elements may have set values, which is a waste of bits. In other words, a NAL unit header that has enough bits to support all possible scalable dimensions simultaneously may lead to bits being wasted in overhead when certain scalable dimensions are not in use.

This disclosure describes various techniques related to signaling characteristics of scalable dimensions of video data. This disclosure describes certain techniques for coding a NAL unit header that can support various scalable dimensions efficiently, e.g., by allowing the NAL unit header to have a variable length. For example, a dimension range parameter set may indicate which of one or more scalable dimensions are active (that is, enabled) for a bitstream, and may further provide data indicating a number of bits used to code values for the active scalable dimensions. Thus, NAL unit headers may include syntax elements for the active scalable dimensions, omitting syntax elements for scalable dimensions that are not active (e.g., that have only one possible value, which may instead be signaled in a separate data structure, such as a sequence parameter set (SPS)). In this manner, for dimensions that are not enabled as being scalable (such as dimensions for which one value is signaled and kept unchanged), values need not be signaled in the NAL unit header. Moreover, an index to value mapping table may map index values to values within active scalable dimensions, such that fewer bits may be used in the NAL unit headers to signal characteristics for the various scalable dimensions that are active.

In another example, a NAL unit header map may specify the layout of fields in a NAL unit header. That is, the NAL unit header map may be used in place of the dimension range parameter set described above. The NAL unit header map may be included in a NAL unit header map parameter set or in a sequence parameter set (SPS). One NAL unit header map may be applicable to an entire bitstream. Using the NAL unit header map of this example may ensure that future extensions, which may be used to add additional scalable dimensions, are backwards compatible with existing standards and existing extensions. The techniques of this example may also ensure that NAL unit headers and SPSs can be parsed, e.g., by avoiding inclusion of NAL unit header extensions in the dimension range parameter set and the SPS. Furthermore, NAL unit headers of this example may avoid including data that emulates a start code, as specified in HEVC WD7. Moreover, these techniques may take advantage of certain benefits associated with including a priority_identifier (priority_id) in the NAL unit header, similar to the priority_id value of SVC and MVC.

FIG. 1 is a block diagram illustrating an example video encoding and decoding system 10 that may utilize techniques for signaling characteristics of scalable dimensions for video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for signaling characteristics of scalable dimensions for video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for signaling characteristics of scalable dimensions for video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, this disclosure describes various techniques that may be performed by source device 12, destination device 14, video encoder 20, video decoder 30, or other devices involved in the processing, transport, storage, or retrieval of video data. For purposes of example, the techniques of this disclosure are described with respect to video encoder 20 and video decoder 30. However, other devices, such as video pre-processing or post-processing units, encapsulators, decapsulators, multiplexers, demultiplexers, media aware network elements (MANEs), or other devices related to processing of video data, may also be configured with any or all of these techniques. The various techniques may be performed alone or together in any combination.

This disclosure introduces a dimension range parameter set, which may be coded by video encoder 20 and video decoder 30. The dimension range parameter set may specify, for a certain bitstream, a range of scalability levels in each scalable dimension. For example, the dimension range parameter set may specify ranges for any or all of a spatial dimension, a temporal dimension, an SNR/quality dimension, a view dimension, a color bit depth dimension, a chroma sample format dimension, or other such scalable dimensions. The dimension range parameter set may be applicable to the whole bitstream. In other words, video encoder 20 may encode all video data of the bitstream such that the encoded video data conforms to the data signaled in the dimension range parameter set, while video decoder 30 may decode all coded video data of the bitstream based at least in part on the data signaled in the dimension range parameter set.

Characteristics of a NAL unit belonging to a particular scalable dimension may or may not vary in the bitstream, as indicated by data of the dimension range parameter set. For example, if a particular characteristic of a scalable dimension does not vary and the bitstream is not scalable in that particular scalable dimension, the characteristic need not be signaled in the NAL unit header.

If a characteristic of a scalable dimension may vary and have N possible values, as indicated by the dimension range parameter set, a particular number of bits may be allocated within the NAL unit header to represent the characteristic of that scalable dimension. For example, assuming N is an integer, ceil(log$_2$(N)) bits may be allocated within the NAL unit header to represent the characteristic, where ceil(X) returns the "ceiling," or a rounded-up (to the next nearest integer, assuming the returned value is not an integer), of X.

Video encoder 20 may jointly signal, and video decoder 30 may jointly retrieve, all characteristics of all possible dimensions in the NAL unit header as a characteristics set. The characteristics set may be mapped to all characteristics of all dimensions.

The characteristics of a dimension may vary. Rather than signaling the real values of scalable dimensions, in some examples, video encoder 20 and video decoder 30 may code index values for the real values of the scalable dimensions. For example, rather than signaling view_id values for views of a view dimension, video encoder 20 and video decoder 30 may code view order index values, which may be mapped to the respective view_id values by a separate mapping table. As another example, a bit depth scalable dimension of a bitstream may include 8-bit, 10-bit, and 12-bit signals. Rather than signaling "8," "10," and "12" in the NAL unit header for such color bit depths, video encoder 20 and video decoder 30 may use values "0," "1," and "2," which again may be mapped to "8," "10," and "12," respectively. Accordingly, video encoder 20 and video decoder 30 may be configured to code an index to value mapping table for the bitstream. The index to value mapping table may form part of the dimension range parameter set, or may be coded as a separate set of data. Such a mapping table may be applicable to a particular coded video sequence or to the entire bitstream.

This disclosure also describes techniques that may be applicable for sub-bitstream extraction. When a bitstream includes one or more scalable dimensions, some destination devices may request various levels of a particular dimension, whereas other destination devices may only request a single level of the particular dimension, e.g., a base level. A media-aware network element (MANE) within a network (not shown in FIG. 1, but may generally correspond to a device along connection 16) may perform sub-bitstream extraction to provide the requested data to the various destination devices.

For example, a view dimension may include multiple different views. One destination device may be capable of multi-perspective three-dimensional playback, and may therefore request all available views. The MANE may, accordingly, provide a sub-bitstream (or the full bitstream) including all available views to this destination device. Another destination device may only be capable of stereoscopic there-dimensional playback, such that the destination device only requests two views. Accordingly, rather than sending all views to this destination device, the MANE may extract a sub-bitstream having only two views and send this sub-bitstream to the destination device.

In accordance with the techniques of this disclosure, a device that performs sub-bitstream extraction, such as a MANE, may modify the dimension range parameter set and, if provided, an index to value mapping table, such that NAL unit headers of NAL units in the extracted sub-bitstream consume fewer bits than the original NAL unit headers of corresponding NAL units in the full bitstream. For example, in the case above where a destination device is only capable of stereoscopic three-dimensional playback, and receives views having, e.g., view order indexes "1" and "7" mapped to view_ids 32 and 159, the MANE may adjust the values of the view order indexes to be "0" and "1," respectively, and adjust the mapping table to map view order index "0" to view_id 32 and view order index "1" to view_id 159.

Table 1 below provides an example set of syntax for a dimension range parameter set:

TABLE 1

| | C | Descriptor |
|---|---|---|
| dim_range_parameter_set_data( ) { | | |
|   dim_parameter_set_id | | u(16) |
|   temporal_id_cnt_bit | | u(3) |
|   chroma_format_cnt_bit | 0 | u(2) |
|   bit_depth_cnt_bit | | u(3) |
|   dependency_cnt_bit | | u(2) |
|   quality_cnt_bit | | u(3) |
|   view_cnt_bit | | u(10) |
|   depth_present_cnt_bit | | u(1) |
|   ... | | |
|   dim_ent_table( ) | | |
|   dim_index_2_value_table( ) | | |
| } | | |

Example semantics for the various syntax elements of Table 1 are described below. Dim_parameter_set_id may indicate the identification of the dimension range parameter set. In some examples, only one dimension parameter set is allowed to be active during the decoding of a whole layered (scalable) coded video sequence. A dimension range parameter can be used for multiple coded video sequences in the bitstream, if the multiple coded video sequences share the same dim_parameter_set_id. The dimension range parameter set may be higher in a parameter set hierarchy than a sequence parameter set. Furthermore, data may be coded in an SPS that identifies the corresponding dimension range parameter set.

Temporal_level_cnt_bit may indicate the number of bits used to signal the temporal_level_cnt, which is explained with respect to Table 2 below. In some examples, when this value is equal to 0, no temporal scalability is supported and each VCL NAL unit is inferred to have temporal_id equal to 0. The number/count of temporal levels supported in this coded video sequence, as indicated by the value of the temporal_level_cnt (explained with respect to Table 2 below), may range from 0 to (2<<temporal_level_cnt_bit−1), inclusive, where "<<" represents the bitwise left-shift operator.

Chroma_format_cnt_bit may indicate the number of bits used to signal the chroma_format_cnt, which is explained with respect to Table 2 below. In some examples, when this value is equal to 0, no chroma sample format scalability is supported and each VCL NAL unit is inferred to have 4:2:0 or 4:4:4 sampling format, depending on the profile. The number/count of chroma sample formats supported in this coded video sequence, indicated by the value of chroma_format_cnt (explained with respect to Table 2 below), ranges from 0 to (2<<chroma_format_cnt_bit−1), inclusive.

Bit_depth_cnt_bit may indicate the number of bits used to signal the bit_depth_cnt, which is explained with respect to Table 2 below. In some examples, when the value of bit_depth_cnt_bit is equal to 0, no color bit-depth scalability is supported and each VCL NAL unit is inferred to be coded as 8-bit or 10-bit or 12-bit, depending on the profile. The number/count of bit depth supported in this coded video sequence, indicated by the value of bit_depth_cnt, may range from 0 to (2<<bit_depth_cnt−1), inclusive.

Dependency_cnt_bit may indicate the number of bits used to signal the dependency_layer_cnt, which is explained with respect to Table 2 below. In some examples, when the value of dependency_cnt_bit is equal to 0, no spatial scalability or CGS is supported and each VCL NAL unit is inferred to have dependency_id equal to 0. The number/count of dependency layers supported in this coded video sequence may range from 0 to (2<<dependency_layer_cnt_bit−1), inclusive.

Quality_cnt_bit may indicate the number of bits used to signal the quality_level_cnt, which is explained with respect to Table 2 below. In some examples, when the value of quality_cnt_bit is equal to 0, no quality/SNR scalability is supported and each VCL NAL unit is inferred to have quality_id equal to 0. The number/count of quality levels supported in this coded video sequence may range from 0 to (2<<quality_cnt_bit−1), inclusive.

View_cnt_bit may indicate the number of bits used to signal the view_cnt, which is explained with respect to Table 2 below. In some examples, when the value of view_cnt_bit is equal to 0, only one view is supported and each VCL NAL unit is inferred to have view_id and view order index equal to 0. The number/count of views supported in this coded video sequence may range from 0 to (2<<view_cnt_bit−1), inclusive.

Depth_present_cnt_bit equal to 0 may indicate that no depth data is included in the bitstream. The value of depth_present_cnt_bit being equal to 1 may indicate that depth VCL NAL units are included in the bitstream, and there may be one bit in the NAL unit header indicating whether a NAL unit is a texture view component or depth view component.

Table 1 above includes element dim_cnt_table( ). Table 2 below represents one example of a set of syntax elements for dim_cnt_table( ) of Table 1. In general, video encoder 20 may signal, and video decoder 30 may receive, only certain syntax elements of Table 2 as indicated by values of the syntax elements discussed above with respect to Table 1.

TABLE 2

|  | C | Descriptor |
|---|---|---|
| dim_cnt_table ( ) { |  |  |
| if (n=temporal_id_cnt_bit) |  |  |
| temporal_level_cnt |  | u(n) |
| if (n=chroma_format_cnt_bit) | 0 |  |
| chroma_format_cnt |  | u(n) |
| if (n= bit_depth_cnt_bit) |  |  |
| bit_depth_cnt |  | u(n) |
| if (n=dependency_cnt_bit) |  |  |
| dependency_layer_cnt |  | u(n) |
| if (n= quality_cnt_bit) |  |  |

TABLE 2-continued

|  | C | Descriptor |
|---|---|---|
| quality_level_cnt |  | u(n) |
| if (n= view_cnt_bit) |  |  |
| view_cnt |  | u(n) |
| if (n= depth_present_cnt_bit) |  |  |
| depth_present_cnt |  | u(n) |
| } |  |  |

Example semantics for the syntax elements of Table 2 are discussed below. Temporal_level_cnt may specify the number of temporal levels supported in the coded video sequence. The value of temporal_level_cnt may be inferred to be 1 when not present. Whether temporal_level_cnt is present may be determined based on the value of temporal_level_cnt_bit of Table 1.

Chroma_format_cnt may specify the number of different chroma sample formats supported in the coded video sequence. The value of chroma_format_cnt may be inferred to be 1 when not present. Whether chroma_format_cnt is present may be determined based on the value of chroma_format_cnt_bit of Table 1.

Bit_depth_cnt_may specify the number of different color bit depths supported in the coded video sequence. The value of bit_depth_cnt may be inferred to be 1 when not present. Whether bit_depth_cnt is present may be determined based on the value of bit_depth_cnt_bit of Table 1.

Dependency_layer_cnt may specify the number of dependency layers supported in the coded video sequence. The value of dependency_layer_cnt may be inferred to be 1 when not present. Whether dependency_layer_cnt is present may be determined based on the value of dependency _cnt_bit of Table 1.

Quality_level_cnt may specify the maximum number of quality levels supported in each dependency layer in the coded video sequence. For example, one quarter common intermediate format (qcif) layer may contain three quality layers and another common intermediate format (cif) layer may contain one quality layer; the quality_cnt in this case may be set to 3. The value of quality_level_cnt may be inferred to be 1 when not present. Whether quality_level_cnt is present may be determined based on the value of quality_cnt_bit of Table 1.

View_cnt may specify the number of views included in the coded video sequence. The value of view_cnt may be inferred to be 1 when not present. Whether view_cnt is present may be determined based on the value of view_cnt_bit of Table 1.

Depth_present_cnt may specify the number of different types of sub-view components in a view component as far as the mulitiview plus depth format is concerned. The value of depth_present_cnt may be inferred to be 1 when not present. Whether depth_present_cnt is present may be determined based on the value of depth_present_cnt_bit of Table 1. The concepts of these techniques may be further extended for any 3D video format that contains one or more auxiliary pictures for each view component, or even layered depth.

In some examples, syntax elements described above may be specific to a particular component, such as a luminance (luma) component or a chrominance (chroma) component. Moreover, separate values may be signaled for luma and for chroma, such as bit depth values.

Syntax elements for scalable dimensions, such as those shown in Table 2 above, generally correspond to one of two categories. In the first category, which may include, e.g., tamporal_id, quality_id and dependency_id, a signaled index value and a value for the corresponding scalable dimension are equivalent. For example, if temporal_level_cnt is 3, temporal_id values may range from 0 to 2, inclusive in all the VCL NAL units.

In the other category, which may include, e.g., a view dimension and a color bit depth dimension, the value of the exact characteristics, such as the view_id and the bit_depth, typically consumes more bits than the index. For example, view_cnt may be set equal to 3, and the three views may have view_id values 4, 6, 8; if 4, 6 and 8 are to be signaled in the NAL unit, up to 4 bits might be needed. On the other hand, if only 0, 1, 2 are to be signaled, only 2 bits are needed. So an index to value mapping table may be signaled to determine the real characteristics (which are more meaningful for applications) from the index values (which are more efficient), for a scalable dimension belonging to this category. Table 3 below represents an example of syntax for an index to value mapping table.

TABLE 3

|  | C | Descriptor |
|---|---|---|
| dim_index_2_value_table ( ) { |  |  |
|   if (chroma_format_cnt) | 0 |  |
|     for (i=0; i< chroma_format_cnt; i++) |  |  |
|       chroma_format_idc[ i ] | 0 | ue(v) |
|   if (bit_depth_cnt) |  |  |
|     for (i=0; i< chroma_format_cnt; i++) |  |  |
|       bit_depth_minus8[ i ] |  | ue(v) |
|   if (view_cnt) |  |  |
|     for (i=0; i< view_cnt; i++) |  |  |
|       view_id[ i ] |  | ue(v) |
| } |  |  |

Example semantics for the index to value mapping table of Table 3 are described below. Chroma_format_idc[i] may specify chroma sampling relative to luma sampling in VCL NAL units with a chroma index equal to i. The value of chroma_format_idc may be in the range of 0 to 3, inclusive. When chroma_format_idc is not present, the value of chroma_format_idc may be inferred to be equal to 1 (4:2:0 chroma format). The chroma_format_idc value may be mapped to the chroma format as shown in Table 4:

TABLE 4

| chroma_format_idc | Chroma Format | SubWidthC | SubHeightC |
|---|---|---|---|
| 0 | 4:2:0 | 2 | 2 |
| 2 | 4:4:4 | 1 | 1 |
| 1 | 4:0:0 | — | — |
| 3 | 4:2:2 | 2 | 1 |

Referring again to Table 3, bit_depth_minus8[i] plus 8 may specify the bit depth of the samples of a color component in the VCL NAL units with a bit depth index equal to i. View_id[i] may specify the view identifier of a NAL unit with a view index equal to i.

Alternatively, in each dimension, a value might only be signaled if the count is larger than 1. In the case that the count is 1, the value corresponding to the 0 index may be inferred by the profile, rather than explicitly signaled. Table 5 below provides an example set of syntax data for this example, where values are signaled only if the count is larger than 1:

TABLE 5

|  | C | Descriptor |
|---|---|---|
| dim_index_2_value_table ( ) { |  |  |
|   if (chroma_format_cnt>1) | 0 |  |
|     for (i=1; i< chroma_format_cnt; i++) |  |  |
|       chroma_format_idc[ i ] | 0 | ue(v) |
|   if (bit_depth_cnt>1) |  |  |
|     for (i=1; i< chroma_format_cnt; i++) |  |  |
|       bit_depth_minus8[ i ] |  | ue(v) |
|   if (view_cnt>1) |  |  |
|     for (i=1; i< view_cnt; i++) |  |  |
|       view_id[ i ] |  | ue(v) |
| } |  |  |

Table 6 below provides an example set of syntax for a sequence parameter set (SPS) in accordance with the techniques of this disclosure. Certain syntax elements may remain the same as in the SPS of HEVC WD7. The semantics for these syntax elements may also remain the same as in the SPS of HEVC WD7. Examples of semantics for added or modified syntax elements of the example of Table 6 are described below.

TABLE 6

|  | C | Descriptor |
|---|---|---|
| seq_parameter_set_data( ) { |  |  |
|   profile_idc | 0 | u(8) |
|   constraint_set0_flag | 0 | u(1) |
|   constraint_set1_flag | 0 | u(1) |
|   constraint_set2_flag | 0 | u(1) |
|   constraint_set3_flag | 0 | u(1) |
|   constraint_set4_flag | 0 | u(1) |
|   reserved_zero_3bits /* equal to 0 */ | 0 | u(3) |
|   level_idc | 0 | u(8) |
|   dim_parameter_set_id | 0 | u(16) |
|   seq_parameter_set_id | 0 | ue(v) |
|   pic_width_in_mbs_minus1 | 0 | ue(v) |
|   pic_height_in_map_units_minus1 | 0 | ue(v) |
|   frame_cropping_flag | 0 | u(1) |
|   if( frame_cropping_flag ) { |  |  |
|     frame_crop_left_offset | 0 | ue(v) |
|     frame_crop_right_offset | 0 | ue(v) |
|     frame_crop_top_offset | 0 | ue(v) |
|     frame_crop_bottom_offset | 0 | ue(v) |
|   } |  |  |
|   if(function_chroma_idc(profile_idc) ) |  |  |
|     chroma_format_idx | 0 | ue(v) |
|   if (function_view(profile_idc)) |  |  |
|     sps_view_extension( ) |  |  |
|   if(function_bit_depth(profile_idc)) |  |  |
|     bit_depth_idx | 0 | ue(v) |
|   vui_parameters_present_flag | 0 | u(1) |
|   if( vui_parameters_present_flag ) |  |  |
|     vui_parameters( ) | 0 |  |
| } |  |  |

In the example of the SPS of Table 6, added or modified syntax elements, relative to the SPS of HEVC WD7, include dim_parameter_set_id, chroma_format_idx, sps_view_extension( ) and bit_depth_idx. The function function_chroma_idc(profile_idc) may be defined as follows: function_chroma_idc(profile_idc) returns 0 if such a profile_idc has a default chroma sample format, e.g., 4:2:0, and returns 1 otherwise. The function function_view(profile_idc) may be defined as follows: function_view(profile_idc) returns 0 if such a profile_idc is related to multiple view coding, and returns 1 otherwise. Sps_view_extension( ) syntax table may contain view dependency and other information related to multiview video coding or 3D video. The function function_bit_depth(profile_idc) may be defined as follows: function_bit_depth(profile_idc) returns 0 if such a profile_idc is coded with a bit depth higher than 8 bit, and returns 1 otherwise.

Table 7 below provides an example set of syntax for a network abstraction layer (NAL) unit header in accordance with the techniques of this disclosure. Certain syntax elements may remain the same as in the NAL unit header of HEVC WD7. The semantics for these syntax elements may also remain the same as in the NAL unit header of HEVC WD7. Examples of semantics for added or modified syntax elements of the example of Table 7 are described below.

TABLE 7

| | Descriptor |
|---|---|
| nal_unit( NumBytesInNALunit ) { | |
|   forbidden_zero_bit | f(1) |
|   nal_flag | u(1) |
|   nal_unit_type | u(6) |
|   NumBytesInRBSP = 0 | |
|   nalUnitHeaderBytes = 1 | |
|   m = | |
|   temporal_id_cnt_bit+chroma_format_cnt_bit+ | |
|   bit_depth_cnt_bit+dependency_cnt_bit+ | |
|   quality_cnt_bit+view_cnt_bit+depth_present_cnt_bit | |
|   nalUnitScalableCharSet | u(m) |
|   r = ((m+7)>>3)<< − m | |
|   reserved_bits | u(r) |
|   nalUnitHeaderBytes+=(m+7)>>3 | |
|   for( i = nalUnitHeaderBytes; i < NumBytesInNALunit; i++) { | |
|     if( i + 2 < NumBytesInNALunit && next_bits( 24 ) = = 0x000003) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     }else | |
|       rbsp_byte[ NumBytesInRBSP++ ] | b(8) |
|   } | |
| } | |

In the example of the NAL unit header of Table 7, added or modified syntax elements, relative to HEVC WD7, include nalUnitScalableCharSet and reserved_bits, as well as calculations of m, r, and nalUnitHeaderBytes. NalUnitScalableCharSet may specify the scalable characteristics set of the NAL unit. The bits in the nalUnitScalableCharSet may be separated to different dimensions based on the dimension range parameter set, e.g., of Table 1.

In one example, video encoder 20 and video decoder 30 may calculate a value for m as:

$m$=temporal_level_cnt_bit(2)+chroma_format_cnt_bit(0)+bit_depth_cnt_bit(0)+dependency_cnt_bit(1)+quality_cnt_plus1_bit(0)+view_cnt_plut1_bit(1)

In this example, m would equal 4 bits. A bitstream for this example may represent stereoscopic (two view) content with, e.g., different spatial layers for each view, and the bitstream may have up to three temporal layers.

In another example, video encoder 20 and video decoder 30 may calculate a value for m as:

$m$=temporal_level_cnt_bit(3)+chroma_format_cnt_bit(0)+bit_depth_cnt_bit(0)+dependency_cnt_bit(0)+quality_cnt_plus1_bit(0)+view_cnt_plut1_bit(1)

In this example, m would equal 4 bits. This may represent a bitstream for typical multiview data, e.g., having seven views with temporal scalability.

In another example, video encoder 20 and video decoder 30 may calculate a value for m as:

$m$=temporal_level_cnt_bit(1)+chroma_format_cnt_bit(0)+bit_depth_cnt_bit(1)+dependency_cnt_bit(0)+quality_cnt_plus1_bit(0)+view_cnt_plut1_bit(0)

This example may represent a bitstream that is coded in an IBPBP (where I corresponds to an I-frame, B corresponds to a B-frame, and P corresponds to a P frame), with bit depth scalability from 8-bit to 10-bit. In this example, m would equal 2 bits.

The dimension range parameter set may include a mapping of the representative syntax element in the NAL unit header to more sophisticated or more advanced characteristics, which might not be directly conveyed by the representative syntax element. For example, view order index or similar representative syntax element might be present in the NAL unit header; however, the view_id information might not be present in the NAL unit header and the mapping of view order index values to view_id values may change in different sequences. Such mapping may convey more information than just the syntax elements in NAL unit header and may provide more advanced adaptation, e.g., based on view_id values. In general, an index of a specific dimension may correspond to a value of i as defined in the index to value mapping table (e.g., dim_index_2_value_table of either of Tables 3 or 5). That is, an index "idx" of a scalable dimension may correspond to the $i^{th}$ value of the scalable dimension as signaled in the index to value mapping table. This table may also be referred to as an index to value syntax mapping table.

In some examples, the techniques of this disclosure relate to an improved design of a unified NAL unit header. For example, a NAL unit header map may be coded instead of the dimension range parameter set described above. The NAL unit header map may be coded in a NAL unit header map parameter set (NPS) or in a sequence parameter set (SPS). In the NAL unit header map, each scalability or view dimension, such as a spatial scalability dimension, a temporal scalability dimension, a quality scalability dimension, or a view scalability dimension, may correspond to a syntax element in the NAL unit header. Moreover, the syntax elements for the various scalability dimensions may have specified lengths for the NAL unit header. That is, syntax data may define lengths for syntax elements in the NAL unit header corresponding to scalability dimensions.

If a value for a specific scalable dimension does not change for a whole coded video sequence (e.g., a whole bitstream), then the length of the syntax element corresponding to that scalable dimension may be defined as zero (0) bits in the NAL unit header, meaning that the syntax element is not present in the NAL unit header, such that a default value may be derived for that scalable dimension for all NAL units in the corresponding bitstream.

In some examples, syntax elements in the NAL unit header may be signaled in a more compact fashion. For example, if there are M possible values of a syntax element, but the values can take N bits (where N is much larger than, e.g., 1<<ceil(log$_2$(M+1))), signaling of the syntax elements in the NAL unit header may be further optimized by signaling only an index to the instances, that is, values for the syntax elements. For example, the view_id in the multiview extension of H.264/AVC typically uses 10 bits. However, if a selected set of views have instances of view_id values as, e.g., 45, 50, 55, and 60, then two bit view indexes (view_idxs) may be used to represent the views, e.g., "00," "01," "10," and "11," respectively. Moreover, syntax data defining a mapping between the view indexes and the view_ids.

The NAL unit header of the NPS NAL unit and the SPS NAL unit may be fixed at one byte, as shown in the NAL unit syntax of Table 12 below, and the nal_ref_flag may be set equal to 1. The nal_unit_type may be equal to 10 for NSP NAL units, and the nal_unit_type may be equal to 5 for SPS NAL units. Other types of NAL units may use different NAL unit types. Alternatively, in some examples, only VCL NAL units include an extended NAL unit header, e.g., as shown in Table 12, while non-VCL NAL units may include one-byte NAL unit headers.

Table 8 below provides an example set of syntax for a network abstraction layer (NAL) unit header map parameter set (NPS) in accordance with the techniques of this disclosure, as an alternative to the dimension range parameter set of Table 1 above. Examples of semantics for syntax elements of the example of Table 8 are described below.

TABLE 8

|  | Descriptor |
| --- | --- |
| nal_unit_header_map( ) { |  |
|   nal_unit_header_map_id | u(8) |
|   priority_id_len | u(3) |
|   temporal_id_len | u(3) |
|   dependency_id_len | u(3) |
|   quality_id_len | u(3) |
|   view_idx_len | u(4) |
|   reserved_flags_len | u(4) |
|   if( priority_id_len && !(temporal_id_len + |  |
|   dependency_id_len + |  |
|     quality_id_len + view_idx_len ) ) |  |
|     priority_map( ) |  |
|   if( view_idx_len ) |  |
|     view_idx2id_table( ) |  |
|   nps_extension_flag | u(1) |
|   if( nps_extension_flag ) |  |
|     while( more_rbsp_data( ) ) |  |
|       nps_extension_data_flag | u(1) |
|   rbsp_trailing_bits( ) |  |
| } |  |

In the example NAL unit header map parameter set syntax of Table 8, the descriptors for nal_unit_header_map_id, temporal_id_len, dependency_id_len, quality_id_len, and view_idx_len are modified relative to HEVC WD7. In addition, the example NAL unit header map parameter set syntax of Table 8 adds syntax elements priority_id_len, reserved_flags_len, priority_map( ) and conditionally signals view_idx2id_table( ). Other syntax elements of the NAL unit header map parameter syntax may remain the same as in HEVC WD7. A NAL unit header map parameter set (NPS) may generally specify a NAL unit header map. In some examples, in each coded video sequence, one and only one NAL unit header map may be active. That is, in some examples, only one NAL unit header map applies to a particular bitstream.

Nal_unit_header_map_id may specify the identification of the NAL unit header map parameter set. As noted above, in some examples, in each coded video sequence, one and only one NAL unit header map may be active. In an alternative example, nal_unit_header_map_id is not present, and each coded video sequence may contain one NAL unit header map NAL unit as the first NAL unit in the coded video sequence.

Priority_id_len may specify the number of bits used to represent the priority_id syntax element in the NAL unit header and the priority_id[i] in the priority map syntax structure. In some examples, when priority_id_len is equal to 0, each VCL NAL unit may be inferred to have priority_id equal to 0. The number of priority layers supported in a coded video sequence referring to the NAL unit header map parameter set may be in the range of 1 to (2<<priority_id_len), inclusive.

Temporal_id_len may specify the number of bits used to represent the temporal_id syntax element in the NAL unit header. In some examples, when temporal_id_len and implicit_temporal_id_len are both equal to 0, no temporal scalability is supported and each VCL NAL unit may be inferred to have temporal_id equal to 0. The number of temporal layers supported in a coded video sequence referring to the NAL unit header map parameter set may be in the range of 1 to (2<<temporal_id_len), inclusive (when temporal_id_len is greater than 0) or 1 to (2<<implicit_temporal_id_len), inclusive (when implicit_temporal_id_len is greater than 0). In some examples, at least one of temporal_id_len and implicit_temporal_id_len is equal to 0.

Dependency_id_len may specify the number of bits used to represent the dependency_id syntax element in the NAL unit header. In some examples, when dependency_id_len and implicit_dependency_id_len are both equal to 0, no spatial scalability or coarse-grain scalability is supported and each VCL NAL unit may be inferred to have dependency_id equal to 0. The number of dependency layers supported in a coded video sequence referring to the NAL unit header map parameter set may be in the range of 1 to (2<<dependency_id_len), inclusive (when dependency_id_len is greater than 0) or 1 to (2<<implicit_dependency_id_len), inclusive (when implicit_dependency_id_len is greater than 0). In some examples, at least one of dependency_id_len and implicit_dependency_id_len is equal to 0.

Quality_id_len may specify the number of bits used to represent the quality_id syntax element in the NAL unit header. In some examples, when quality_id_len and implicit_quality_id_len are both equal to 0, no quality/SNR scalability is supported and each VCL NAL unit may be inferred to have quality_id equal to 0. The number of quality layers supported in a coded video sequence referring to the NAL unit header map parameter set may be in the range of 1 to (2<<quality_id_len), inclusive (when quality_id_len is greater than 0) or 1 to (2<<implicit_quality_id_len), inclusive (when implicit_quality_id_len is greater than 0). In some examples, at least one of quality_id_len and implicit_quality_id_len is equal to 0.

View_idx_len may specify the number of bits used to represent the view_idx syntax element. In some examples, when view_cnt_len and implicit_view_id_len are both equal to 0, only one view is supported and each VCL NAL unit may be inferred to have view_id and view order index both equal to 0. The number of views supported in a coded video sequence referring to the NAL unit header map parameter set may be in the range of 1 to (2<<view_idx_len), inclusive (when view_idx_len is greater than 0) or 1 to (2<<implicit_view_id_len), inclusive (when implicit_view_idx_len is greater than 0). In some examples, at least one of view_idx_len and implicit_view_idx_len is equal to 0.

Reserved_flags_len may specify the number of bits used to represent the reserved_flags syntax element. When the reserved_flags are allocated to one or more syntax elements, reserved_flags_len may be modified accordingly, and a length syntax element for the new one or more syntax elements may be signaled in the NPS.

Nps_extension_flag equal to 0 may specify that no nps_extension_data_flag syntax elements are present in the NAL unit header map parameter set RBSP syntax structure.

Nps_extension_flag may be equal to 0 in bitstreams conforming to these example techniques. The value of 1 for nps_extension_flag may be reserved for future use by ITU-T|ISO/IEC. Video decoders may be configured to ignore all data that follow the value 1 for nps_extension_flag in a NAL unit header map parameter set NAL unit, unless an extension has been adopted and is supported by the video decoders.

Nps_extension_data_flag may have any value. It does not currently affect the conformance to profiles in accordance with the techniques of this disclosure.

As shown in Table 8, a priority_map( ) syntax element may be signaled in certain circumstances. Table 9 below provides an example set of syntax data for the priority map( ) of Table 8. Semantics for the syntax elements of Table 9 are described below. In general, the priority map syntax structure specifies, for each priority_id value, one or more of a range of temporal_id values, a range of dependency_id values, a range of quality_id values, and a number of view_idx values.

TABLE 9

| | Descriptor |
|---|---|
| priority_map( ) { | |
|   num_priority_ids | u(v) |
|   implicit_temporal_id_len | u(3) |
|   implicit_dependency_id_len | u(3) |
|   implicit_quality_id_len | u(3) |
|   implicit_view_idx_len | u(4) |
|   for( i = 0; i <num_priority_ids; i++ ) { | |
|     priority_id[ i ] | u(v) |
|     if( implicit_temporal_id_len ) { | |
|       t_id_low_range[ i ] | u(v) |
|       t_id_high_range[ i ] | u(v) |
|     } | |
|     if( implicit_dependency_id_len ) { | |
|       d_id_low_range[ i ] | u(v) |
|       d_id_high_range[ i ] | u(v) |
|     } | |
|     if( implicit_quality_id_len ) { | |
|       q_id_low_range[ i ] | u(v) |
|       q_id_high_range[ i ] | u(v) |
|     } | |
|     if( implicit_view_idx_len ) { | |
|       num_views_for_priority_minus1[ i ] | u(v) |
|       for ( j = 0 ; j <= num_views_for_priority_minus1; j++ ) | |
|         view_idx[ i ][ j ] | u(v) |
|     } | |
|   } | |
| } | |

Num_priority_ids may specify the number of priority_id values in a coded video sequence referring to the NAL unit header map parameter set. The number of bits used to represent num_priority_ids may be equal to priority_id_len.

Implicit_temporal_id_len may specify the number of bits used to represent the temporal_id[i] syntax element. In some examples, when not present, the value of implicit_temporal_id_len may be inferred to be equal to 0.

Implicit_dependency_id_len may specify the number of bits used to represent the dependency_id[i] syntax element. In some examples, when the priority_map( ) syntax structure is not present, the value of implicit_dependency_id_len may be inferred to be equal to 0.

Implicit_quality_id_len may specify the number of bits used to represent the quality_id[i] syntax element. In some examples, when the priority_map( )) syntax structure is not present, the value of implicit_quality_id_len may be inferred to be equal to 0.

Implicit_view_id_len may specify the number of bits used to represent the view_id[i] syntax element. In some examples, when the priority_map( ) syntax structure is not present, the value of implicit_view_id_len may be inferred to be equal to 0.

Priority_id[i] may specify the i-th priority_id value for which one or more of a range of temporal_id values, a range of dependency_id values, a range of quality_id values, and a range of view_id values are specified by the following syntax elements. The number of bits used to represent priority_id[i] may be priority_id_len.

T_id_low_range[i] and t_id_high_range[i] may specify a range of temporal_id values corresponding to the i-th priority_id. The range of temporal_id values may be from t_id_low_range[i] to t_id_high_range[i]−1, inclusive. The number of bits used to represent these syntax elements may be implicit_temporal_id_len. In some examples, when not present, the range may be inferred to be from 0 to 0.

D_id_low_range[i] and d_id_high_range[i] may specify a range of dependency_id values corresponding to the i-th priority_id. The range of dependency_id value may be from d_id_low_range[i] to d_id_high_range[i]−1, inclusive. The number of bits used to represent these two syntax elements may be implicit_dependency_id_len. In some examples, when not present, the range may be inferred to be from 0 to 0.

Q_id_low_range[i] and q_id_high_range[i] may specify a range of quality_id values corresponding to the i-th priority_id. The range of the quality_id values may be from q_id_low_range[i] to q_id_high_range[i]−1, inclusive. The number of bits used to represent these two syntax elements may be implicit_quality_id_len. In some examples, when not present, the range may be inferred to be from 0 to 0.

Video encoder 20 and video decoder 30 may derive the variable DQRange[i] as follows:

$$DQRange[i]=[d\_id\_low\_range[i]*maxQlayer+ q\_id\_low\_range[i], d\_id\_high\_range[i]*maxQlayer+q\_id\_high\_range[i]] \quad (1)$$

where maxQlayer is the maximum value of quality_id of all coded video sequences referring to the NAL unit header map parameter set.

In some examples, for any two priority_id values, if the other scalability dimension ranges are the same, the DQ ranges of the two priority_id values do not overlap.

Num_views_for_priority_minus1[i] may specify the number of view_idx values correspond to the i-th priority_id. The value of num_views_for_priority_minus1 may be in the range of 0 to ((1<<implicit_view_id_len)−1), inclusive.

View_idx[i][j] may specify the j-th view order index corresponding to the i-th priority_id value. The number of bits used to represent view_id[i][j] may be implicit_view_idx_len. In some examples, when not present, the value of view_idx[i][j] may be inferred to be equal to 0.

As also shown in Table 8, in some cases, a view index to view ID table (view_idx2id_table( )) may be signaled in the NAL unit header map parameter set. An example set of syntax for the view index to view ID table is shown in Table 10 below. Example semantics for the view index to view ID table are described below. In general, the view index to view ID table specifies the map of each view index value to a view identifier value. A view index value may be signaled in the NAL unit header and the corresponding view identifier may be determined from data specified in the view index to view ID table.

TABLE 10

| | Descriptor |
|---|---|
| view_idx2id_table( ) { | |
|   view_cnt | u(v) |
|   if( view_cnt ) | |
|     for( i=0; i< view_cnt; i++) | |
|       view_id[ i ] | u(v) |
| } | |

View_cnt may specify the maximum number of views included in a coded video sequence referring to the NAL unit header map parameter set. The number of bits used to represent view_cnt may be equal to view_idx_len.

View_id[i] may specify the view identifier of a NAL unit with view index equal to i.

Table 11 below illustrates an example set of syntax data for a sequence parameter set (SPS) in accordance with the techniques of this disclosure. Semantics for added or changed syntax elements, relative to HEVC WD7, are discussed below. Other syntax elements of this example SPS are not discussed in detail, and the semantics for unchanged syntax elements may remain the same, e.g., as defined in HEVC WD7.

TABLE 11

| | Descriptor |
|---|---|
| seq_parameter_set_rbsp( ) { | |
|   profile_idc | u(8) |
|   reserved_zero_8bits /* equal to 0 */ | u(8) |
|   level_idc | u(8) |
|   nal_unit_header_map_id | u(8) |
|   seq_parameter_set_id | ue(v) |
|   ... | |
|   rbsp_trailing_bits( ) | |
| } | |

In the example of Table 11, the SPS includes an additional syntax element, "nal_unit_header_map_id." As noted above, semantics for other syntax elements, including those not shown and represented by ellipses, may remain unchanged, e.g., as defined in HEVC WD7. In this example, nal_unit_header_map_id may specify an identifier of a NAL unit header map parameter set referred to by the sequence parameter set. Thus, the SPS may identify a NAL unit header map that is used during coding of the sequence to which the SPS corresponds.

Table 12 below illustrates an example set of syntax elements for a NAL unit. Again, certain syntax elements are added or changed relative to HEVC WD7, for which example semantics are described below. Other syntax elements that are not changed relative to HEVC WD7 may maintain the semantics defined in HEVC WD7.

TABLE 12

| | Descriptor |
|---|---|
| nal_unit( NumBytesInNALunit ) { | |
|   forbidden_zero_bit | f(1) |
|   nal_ref_flag | u(1) |
|   nal_unit_type | u(6) |
|   NumBytesInRBSP = 0 | |
|   nalUnitHeaderBytes = 1 | |
|   if( nal_unit_type != 10 && nal_unit_type != 5 ) { // not NAL unit header map NAL unit or SPS NAL unit | |
|     if( priority_id_len ) | |
|       priority_id | u(v) |

TABLE 12-continued

| | Descriptor |
|---|---|
|     if( temporal_id_len ) | |
|       temporal_id | u(v) |
|     reserved_one_bit | u(1) |
|     if( dependency_id_len ) | |
|       dependency_id | u(v) |
|     if( quality_id_len ) | |
|       quality_id | u(v) |
|     reserved_one_bit | u(1) |
|     if( view_idx_len ) | |
|       view_idx | u(v) |
|     if( reserved_flags_len ) | |
|       reserved_flags | u(v) |
|     m = priority_id_len + temporal_id_len + dependency_id_len + quality_id_len + view_idx_len + reserved_flags_len + 2 | |
|     if( ( ( m + 7 >> 3 ) << 3 ) − m ) | |
|       reserved_bits | u(v) |
|     nalUnitHeaderBytes += ( ( m + 7 ) >> 3 ) | |
|   } | |
|   for( i = nalUnitHeaderBytes; i < NumBytesInNALunit; i++) { | |
|     if( i + 2 < NumBytesInNALunit && next_bits( 24 ) == 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

In this example, a restriction may be defined such that the NAL unit header shall contain no consecutive 3 bytes that are equal to 0x000000, 0x000001, 0x000002, or 0x000003. The semantics of priority_id may be similar to the same syntax element in SVC, except that the number of bits used to represent priority_id may be priority_id_len, as specified in a corresponding nal_unit_header_map, e.g., in accordance with Table 8. The semantics of temporal_id may be the same as in HEVC WD7, except that the number of bits used to represent temporal_id may be temporal_id_len, as specified in a corresponding nal_unit_header_map, e.g., in accordance with Table 8.

In this example, reserved_one_bit shall be equal to 1. The value 0 for reserved_one_bit may be specified by future extension of the relevant coding standard, e.g., HEVC. Decoders such as video decoder 30 may be configured to ignore the value of reserved_one_bit.

The semantics of dependency_id may be the same the same syntax element as in SVC, except that the number of bits used to represent dependency_id may be dependency_id_len, as specified in a corresponding nal_unit_header_map, e.g., in accordance with Table 8. The semantics of quality_id may be the same as the same syntax element in SVC, except that the number of bits used to represent quality_id may be quality_id_len, as specified in a corresponding nal_unit_header_map, e.g., in accordance with Table 8. View_idx may specify the view order index for a view. The semantics of view_idx may be the same as view order index in MVC, except that the number of bits used to represent view_idx may be view_idx_len, as specified in a corresponding nal_unit_header_map, e.g., in accordance with Table 8.

In some examples, each bit of reserved_flags may be equal to 1. Other values for reserved_flags may be specified by future extension of a relevant coding standard, e.g., HEVC. Decoders such as video decoder 30 may be configured to ignore the value of reserved_flags. The number of bits used to represent reserved_flags may be reserved_flags_len, as specified in a corresponding nal_unit_header_map, e.g., in accordance with Table 8. In some examples, each bit of reserved_bits may be equal to 1. Other values for reserved_bits may be specified by future standards or extensions of standards, such as extensions of HEVC. Decoders such as video decoder 30 may be configured to ignore the value of reserved_bits. The number of bits used to represent reserved_bits may be (((m+7)>>3)<<3)−m).

As an alternative to the techniques described above, implicit_temporal_id_len, implicit_dependency_id_len, implicit_quality_id_len and implicit_view_idx_len can be absent (that is, not signaled) and the other syntax elements can be signaled with a fixed length, depending on the maximum values of the syntax elements for priority_id, temporal_id, dependency_id and quality_id in the specification, or be signaled with ue(v), that is, unsigned integer exponential-Golomb (Exp-Golomb) bit strings.

In some examples, the priority map of Table 9 may be replaced by the priority map of Table 13 below.

TABLE 13

|  | Descriptor |
|---|---|
| priority_map( ) { | |
|   num_priority_ids | u(v) |
|   ... | |
|   if( implicit_quality_id_len ) { | |
|     q_id_low_range[ i ] | u(v) |
|     q_id_high_range[ i ] | u(v) |
|   } | |
|   if( implicit_view_idx_len ) { | |
|     v_idx_low_range[ i ] | |
|     v_idx_high_range[ i ] | |
|   } | |
|   } | |
| } | |

The syntax elements and semantics thereof for the priority map of Table 13 may generally remain the same as for those of Table 9. However, rather than signaling view indexes for the number of views for a particular priority ID, the priority map of Table 13 provides v_idx_low_range[i] and v_idx_high_range[i]. In this example, v_idx_low_range[i] and v_idx_high_range[i] specify a range of view_idx values corresponding to the i-th priority_id. The range of temporal_id values may be from v_idx_low_range[i] and v_idx_high_range[i]−1, inclusive. The number of bits used to represent these two range values may be implicit_view_idx_len. When not present, the range may be inferred from 0 to 0.

In some examples, instead of signaling the low range and high range for a specific syntax element (e.g., tempora_id), it is possible to just signal the high end (or low end) of the range, e.g., temporal_id_high. Thus, video coders may be configured to infer a value for the unsignaled portion of the range, e.g., zero for temporal_id_low.

In some examples, none of priority_id, temporal_id, dependency_id, quality_id and view_idx is explicitly signaled in the NAL unit header. Instead, one or more of these syntax elements may be implicitly signaled in a syntax structure named implicit_id_table( ) which may replace the priority_map( ) syntax structure. An example of the implicit_id_table( ) is shown in Table 14, with examples of semantics for the syntax elements provided below.

TABLE 14

|  | Descriptor |
|---|---|
| implicit_id_table( ) { | |
|   implicit_priority_id_len | u(3) |
|   num_priority_ids | u(v) |
|   implicit_temporal_id_len | u(3) |
|   implicit_dependency_id_len | u(3) |
|   implicit_quality_id_len | u(3) |
|   implicit_view_idx_len | u(4) |
|   for( i = 0; i < num_priority_ids; i++ ) { | |
|     priority_id[ i ] | u(v) |
|     if( implicit_temporal_id_len ) { | |
|       t_id_low_range[ i ] | u(v) |
|       t_id_high_range[ i ] | u(v) |
|     } | |
|     if( implicit_dependency_id_len ) { | |
|       d_id_low_range[ i ] | u(v) |
|       d_id_high_range[ i ] | u(v) |
|     } | |
|     if( implicit_quality_id_len ) { | |
|       q_id_low_range[ i ] | u(v) |
|       q_id_high_range[ i ] | u(v) |
|     } | |
|     if( implicit_view_idx_len ) { | |
|       num_views_for_priority_minus1[ i ] | u(v) |
|       for ( j = 0 ; j <= num_views_for_priority_minus1; j++ ) | |
|         view_idx[ i ][ j ] | u(v) |
|     } | |
|   } | |
| } | |

The example syntax structure of Table 14 specifies a number of priority_id values and, for each priority_id value, one or more of a range of temporal_id values, a range of dependency_id values, a range of quality_id values, and a number of view_idx values. Implicit_priority_id_len may specify the number of bits used to represent the num_priority_ids and priority_id[i] syntax element. When not present, the value of implicit_priority_id_len may be inferred to be equal to 0. Num_priority_ids may specify the number of priority_id[i] syntax elements. The number of bits used to represent num_priority_ids may be equal to implicit_priority_id_len. Implicit_temporal_id_len may specify the number of bits used to represent the temporal_id[i] syntax element. When not present, the value of implicit_temporal_id_len may be inferred to be equal to 0.

Implicit_dependency_id_len may specify the number of bits used to represent the dependency_id[i] syntax element. When the priority_map( ) syntax structure is not present, the value of implicit_dependency_id_len may be inferred to be equal to 0. Implicit_quality_id_len may specify the number of bits used to represent the quality_id[i] syntax element. When the priority_map( ) syntax structure is not present, the value of implicit_quality_id_len may be inferred to be equal to 0. Implicit_view_idx_len may specify the number of bits used to represent the view_id[i] syntax element. When the priority_map( ) syntax structure is not present, the value of implicit_view_idx_len may be inferred to be equal to 0.

Priority_id[i] may specify the i-th priority_id value for which one or more of a range of temporal_id values, a range of dependency_id values, a range of quality_id values, and a range of view_id values are specified by the following syntax elements: t_id_low_range[i], t_id_high_range[i], d_id_low_range[i], d_id_high_range[i], q_id_low_range[i], and q_id_high_range[i]. The number of bits used to represent priority_id[i] may be implicit_priority_id_len. Alternatively, the priority_id[i] can be absent and the priority_id[i] can be inferred to be equal to i or some other value as a function of i.

T_id_low_range[i] and t_id_high_range[i] may specify a range of temporal_id values corresponding to the i-th priority_id. The range of temporal_id values may be from t_id_low_range[i] to t_id_high_range[i]−1, inclusive. The number of bits used to represent these syntax elements may be implicit_temporal_id_len. When not present, the range may be inferred to be from 0 to 0.

D_id_low_range[i] and d_id_high_range[i] may specify a range of dependency_id values corresponding to the i-th priority_id. The range of dependency_id value may be from d_id_low_range[i] tod_id_high_range[i]−1, inclusive. The number of bits used to represent these two syntax elements may be implicit_dependency_id_len. When not present, the range may be inferred to be from 0 to 0.

Q_id_low_range[i] and q_id_high_range[i] may specify a range of quality_id values corresponding to the i-th priority_id. The range of the quality_id values may be from q_id_low_range[i] to q_id_high_range[i]−1, inclusive. The number of bits used to represent these two syntax elements may be implicit_quality_id_len. When not present, the range may be inferred to be from 0 to 0.

The variable DQRange[i] may be derived as follows:

DQRange[i]=[d_id_low_range[i]*maxQlayer+
q_id_low_range[i], d_id_high_range[i]*max-
Qlayer+q_id_high_range[i]], where maxQlayer is the maximum value of quality_id of all coded video sequences referring to the NAL unit header map parameter set.

For any two priority_id values, if the other scalability dimension ranges are the same, their DQ ranges may be set so that the DQ ranges do not overlap.

Num_views_for_priority_minus1[i] may specify the number of view_idx values correspond to the i-th priority_id. The value of num_views_for_priority_minus1 may be in the range of 0 to ((1<<implicit_view_id_len)−1), inclusive. View_idx[i][j] may specify the j-th view order index corresponding to the i-th priority_id value. The number of bits used to represent view_id[i][j] may be implicit_view_idx_len. When not present, the value of view_idx[i][j] may be inferred to be equal to 0.

Accordingly, in one example, video encoder 20 and video decoder 30 (or other elements of source device 12 and destination device 14) may be configured to code syntax data conforming to any or all of Tables 1-7 to code, for a bitstream, information representative of which of a plurality of video coding dimensions are enabled for the bitstream, and to code values for each of the enabled video coding dimensions, without coding values for the video coding dimensions that are not enabled, in a network abstraction layer (NAL) unit header of a NAL unit comprising video data coded according to the values for each of the enabled video coding dimensions.

Alternatively, in another example, video encoder 20 and video decoder 30 (or other elements of source device 12 and destination device 14), may be configured to code syntax data conforming to any or all of Tables 8-14 to code, for a bitstream, information representative of which of a plurality of video coding dimensions are enabled for the bitstream, and to code values for each of the enabled video coding dimensions, without coding values for the video coding dimensions that are not enabled, in a network abstraction layer (NAL) unit header of a NAL unit comprising video data coded according to the values for each of the enabled video coding dimensions.

In still other examples, various aspects of Tables 1-14 may be combined, in any combination, to form a hybrid of these examples to code, for a bitstream, information representative of which of a plurality of video coding dimensions are enabled for the bitstream, and to code values for each of the enabled video coding dimensions, without coding values for the video coding dimensions that are not enabled, in a network abstraction layer (NAL) unit header of a NAL unit comprising video data coded according to the values for each of the enabled video coding dimensions.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
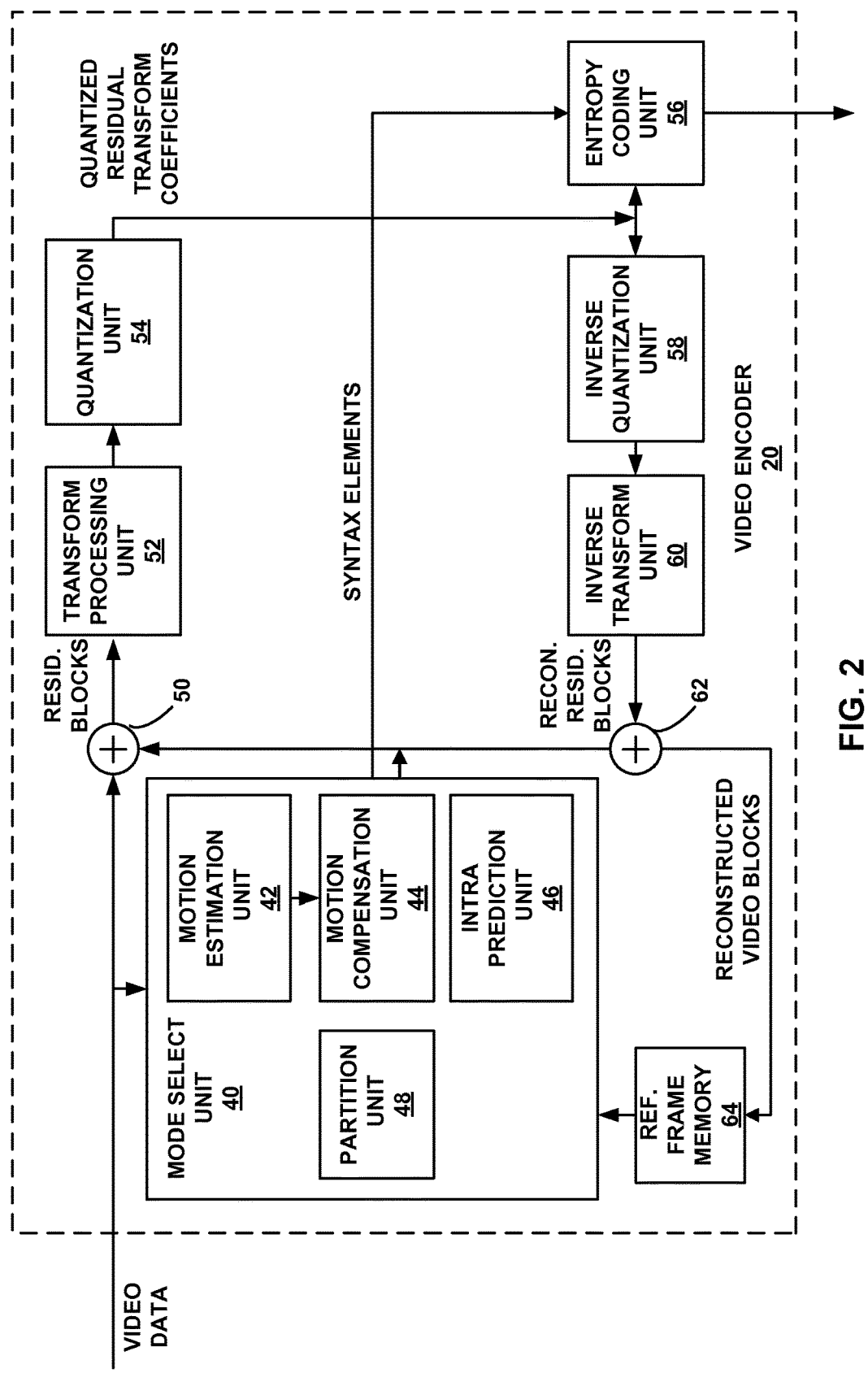
FIG. 2 is a block diagram illustrating an example of a video encoder that may implement techniques for signaling characteristics of scalable dimensions for video data.

FIG. 2 is a block diagram illustrating an example of video encoder 20 that may implement techniques for signaling characteristics of scalable dimensions for video data. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In addition, video encoder 20 may be configured to code video data having one or more various scalable video coding dimensions. For example, video encoder 20 may be configured to code various views, quality layers (e.g., signal-to-noise ratio (SNR) layers), priority layers, spatial resolution layers, temporal layers, color bit depth layers, chroma sample format layers, dependency layers, or other such scalable dimensions. In general, a scalable dimension has either one value (e.g., video data is not scaled in that dimension) or a range of values. Without loss of generality, assume that the "low" value in a range of values for a scalable dimension is used as a basis for coding higher values in the range. Thus, a base layer (e.g., a base view, a base quality layer, a base scalable layer, or the like) may be used as reference when coding one or more higher layers of the scalable dimension.

As an example, for multi-view video coding, a base layer (e.g., a base view) may be used for two-dimensional video displays, as well as a reference for higher layers along the dimension. In other words, the base view may be intra-view coded, that is, coded without reference to any other views. Other views may be inter-view coded, e.g., coded relative to another view, such as the base view. In this manner, a bitstream including video data may include only a single view layer (that is, a single value for a view dimension) or multiple view layers (that is, multiple possible values for a view dimension).

To perform inter-view prediction, video encoder 20 may predict blocks of a current picture of a particular view relative to one or more pictures of previously coded views having the same temporal location as the current picture. That is, when ultimately encapsulated within an access unit, the current picture and the reference pictures may each be encapsulated within the same access unit. Thus, when ultimately displayed, the current picture and the reference pictures may be displayed at substantially the same time. Moreover, the current picture and the reference pictures may have the same relative picture order count (POC) values.

More particularly, inter-view prediction may involve calculating one or more disparity vectors for a current block of a current picture in a current view. The disparity vectors may generally describe the location of a closely-matching block in a reference picture of a previously coded view. Motion estimation unit 42 may be configured to perform a search for this closely-matching block in the reference picture of the previously coded view. Thus, in some examples, motion estimation unit 42 may be referred to as a "motion/disparity estimation unit." Disparity vectors may generally operate in a manner similar to disparity vectors, except that disparity vectors describe displacement relative to a reference picture of a different view. Moreover, disparity vectors typically only describe horizontal offset, as different views correspond to camera perspectives that are shifted horizontally relative to each other.

As another example, for a spatial resolution dimension, video encoder 20 may be configured to code pictures having an original spatial resolution using two or more layers: one base layer and one or more enhancement layers. Pictures of the base layer may have a resolution smaller than the original spatial resolution, and pictures of the enhancement layers may include data for increasing the resolution of the base layer pictures. For example, the original spatial resolution may correspond to 1080p. In this example, there may be three layers: a base layer including pictures having a spatial resolution of 480p, a first enhancement layer for achieving a spatial resolution of 720p, and a second enhancement layer for achieving a spatial resolution of 1080p.

Video encoder 20 may code video data of the base layer independently of any other layers. Video encoder 20 may then code video data of the enhancement layers relative to a lower layer, e.g., the base layer or a lower enhancement layer. To produce these layers from original data, video encoder 20 may first decimate, subsample, or otherwise reduce the spatial resolution of an original picture to produce a base layer picture. Video encoder 20 may then code the base layer picture using intra-picture or inter-picture (e.g., temporal) coding techniques as described above.

Video encoder 20 may then decode and upsample (e.g., interpolate) the base layer picture to produce a picture having a spatial resolution at the next enhancement layer. Video encoder 20 may also reduce the resolution of the original picture to produce a picture having the spatial resolution of this enhancement layer. Video encoder 20 may then calculate pixel-by-pixel differences between the reduced resolution picture and the upsampled base layer picture to produce residual data for the enhancement layer, which video encoder 20 may transform, quantize, and entropy encode. Video encoder 20 may repeat this process, treating the most recently coded enhancement layer as a base layer, for all enhancement layers that are to be coded. Similarly, video encoder 20 may encode pictures at various other layers for various other scalable dimensions.

As yet another example, video encoder 20 may code video data having a scalable temporal dimension. In general, video encoder 20 may assign temporal identifiers to pictures such that the temporal identifiers can be used to describe the temporal layer to which the picture belongs. Moreover, video encoder 20 may code video data at a particular temporal layer such that the video data is predicted only relative to other video data at that temporal layer or a lower temporal layer. In this manner, sub-bitstream extraction can be performed to extract a sub-bitstream for a reduced frame rate relative to the frame rate of the full bitstream, and the sub-bitstream will be properly decodable, because non-extracted video data will not be used for reference for the extracted sub-bitstream.

Video encoder 20 may encode video data conforming to a plurality of scalable dimensions. In general, video encoder 20 ultimately produces a set of NAL units corresponding to a particular intersection of each of the scalable dimensions. For example, suppose that for a particular bitstream, a temporal dimension is scalable and a spatial resolution dimension is scalable, and other dimensions are fixed. Suppose further that there are four temporal layers in the temporal dimension and three spatial resolution layers in the spatial resolution dimension. Accordingly, each access unit may include NAL units for all three spatial resolutions. In this manner, sub-bitstreams may be extracted by extracting access units only up to a particular temporal layer, and/or extracting NAL units from those access units up to a particular spatial resolution layer.

As another example, suppose that for a particular bitstream, a view dimension is scalable and a spatial resolution dimension is scalable, and other dimensions are fixed. Suppose further that there are eight views in the view dimension and three spatial resolution layers in the spatial resolution dimension. Accordingly, each access unit may include NAL units for twenty-four pictures: eight views, and three spatial resolutions for each of these eight views. In this example, sub-bitstreams may be extracted by determining which of the views to retrieve and which of the spatial resolutions of these views to retrieve, and extracting NAL units having view identifiers for the determined views and having the determined spatial resolutions.

More generally, let the number of enabled scalable dimensions for a bitstream be N, where N is a whole number. For each of the enabled scalable dimensions $D_1, D_2, \ldots D_N$, let there be a range of layers from 1 to $Max_K$, where $1<=K<=N$. Then, for the bitstream, there may be a total number of pictures of $Max_1 * Max_2 * \ldots * Max_N$, or $$\prod_{K=1}^{N} Max_K.$$

Each of the scalable dimensions may intersect at a particular picture, for which there may be one or more NAL units in a corresponding access unit. In accordance with the techniques of this disclosure, each of the NAL units may include data indicating to which of the pictures the NAL unit corresponds. Moreover, the NAL units need not include data for non-scalable dimensions. Thus, although there may be P total scalable dimensions possible, if N is less than P, NAL units need only include data for the N enabled scalable dimensions to indicate values for the N enabled scalable dimensions, without including values for the (P-N) non-enabled scalable dimensions. Moreover, video encoder 20 may code a dimension range parameter set or a NAL unit header map parameter set to indicate which of the scalable dimensions are active and, in some cases, a number of bits in the NAL unit header used to represent data for each of the active scalable dimensions.

Thus, referring again to the example above in which there are eight views and three spatial scalability layers, video encoder 20 may allocate three bits to the view identifier portion of the NAL unit header and two bits to the spatial scalability layer portion of the NAL unit header. Together, these five bits may indicate both the view to which a NAL unit corresponds and the spatial scalability layer to which the NAL unit corresponds. For example "00010" may correspond to the base view "000" and the first enhancement layer of the spatial scalability layers "10," whereas "11100" may correspond to the eighth view "111," and the base layer of the spatial scalability layers "00." In general, assuming that there are N possible values for a particular enabled scalable dimension, video encoder 20 may allocated ceil ($log_2(N)$) bits in the NAL unit header, where ceil(X) returns a value for X that is rounded up to the next highest integer value. Thus, when X is an integer value, ceil(X) returns X, whereas when X is a rational number expressed as A·B, ceil(X) returns (A+1).

Video encoder 20 may receive definitions for a number of enabled (also referred to as "active") scalable dimensions from an external source, e.g., a user or configuration data. In addition, the definitions may also include information indicating a range of potential values for each of the enabled scalable dimensions. Accordingly, video encoder 20 may allocate the number of bits to be used in the NAL unit header for the various scalable dimensions based on these received definitions. Video encoder 20 may then construct the dimension range parameter set or NAL unit header map parameter set based on these allocations, and also code NAL unit headers based on the allocated bits.

In addition, where values for a particular scalable dimension do not increase atomically by one (e.g., in the case of view_ids), video encoder 20 may code a mapping table that maps index values to values of the scalable dimension. For example, suppose that there are eight views for a bitstream having view_ids of 1, 18, 46, 169, 200, 250, 385, and 399. Video encoder 20 may map view indexes of 0, 1, 2, 3, 4, 5, 6, and 7 to these view_id values, and code a mapping table accordingly. In this manner, video encoder 20 may code NAL unit headers indicating the view indexes, rather than the view_ids directly. A decoder, such as video decoder 30, may refer to the mapping table to determine a view_id for a NAL unit based on the view index.

In this manner, video encoder 20 of FIG. 2 represents an example of a video encoder configured to code, for a bitstream, information representative of which of a plurality of video coding dimensions are enabled for the bitstream, and to code values for syntax elements representative of the enabled video coding dimensions, without coding values for syntax elements representative of the video coding dimensions that are not enabled, in a network abstraction layer (NAL) unit header of a NAL unit comprising video data coded according to the values for each of the enabled video coding dimensions.

Figure 3:
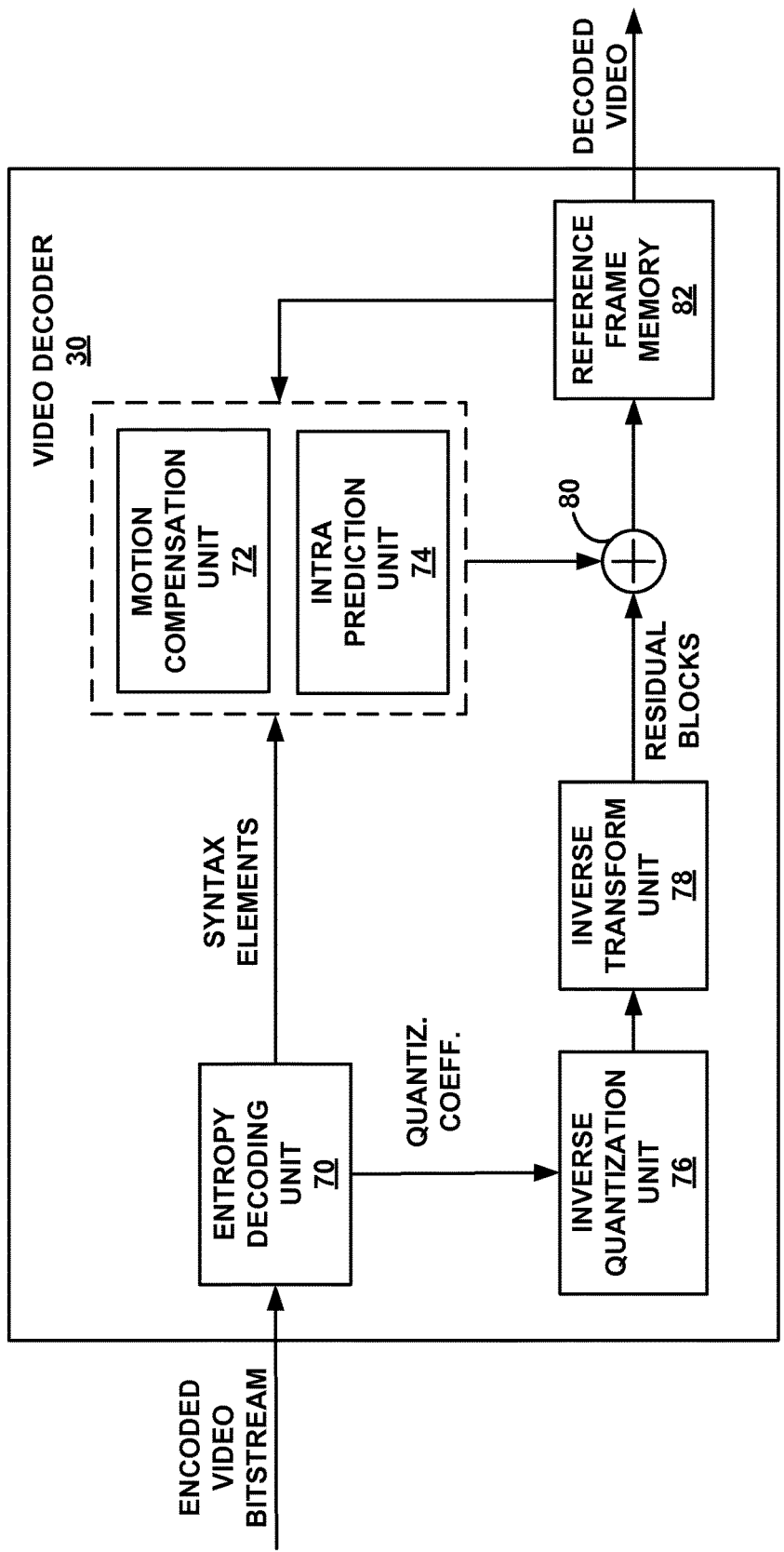
FIG. 3 is a block diagram illustrating an example of a video decoder that may implement techniques for signaling characteristics of scalable dimensions for video data.

FIG. 3 is a block diagram illustrating an example of video decoder 30 that may implement techniques for signaling characteristics of scalable dimensions for video data. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Video decoder 30 may also be configured to decode video data that is coded according to one or more scalable dimensions. For example, video decoder 30 may decode video data having various views, quality layers (e.g., signal-to-noise ratio (SNR) layers), priority layers, spatial resolution layers, temporal layers, color bit depth layers, chroma sample format layers, dependency layers, or other such scalable dimensions. In general, video decoder 30 may decode these layers in a manner generally reciprocal to that used to encode the layers.

Moreover, video decoder 30 (or another unit communicatively coupled to video decoder 30) may use NAL unit header data to determine one or more layers to which video data of a particular NAL unit corresponds. For example, if a bitstream is scalable in terms of a view dimension, a spatial resolution dimension, and a temporal dimension, video decoder 30 may determine the view, spatial resolution layer, and temporal identifier for data of a NAL unit from the NAL unit header in accordance with the techniques of this disclosure. The determination of the layers to which the video data corresponds may influence how parsing and/or decoding of the video data is performed. For example, if a NAL unit corresponds to a base view of multi-view video data, video decoder 30 need not attempt to determine whether video data of the NAL unit is inter-view coded.

Furthermore, to interpret the NAL unit header, video decoder 30 may refer to other syntax data, such as syntax data signaled in a dimension range parameter set or a NAL unit header map parameter set. Such syntax data may indicate which of a plurality of scalable dimensions are enabled, and a number of bits in the NAL unit header allocated to each of the enabled scalable dimensions. In this manner, if video decoder 30 receives bits "0101101," and syntax data indicates that the first three bits identify a view index, the next two bits identify a spatial resolution layer, and the last two bits identify a temporal layer, video decoder 30 may determine that the view index is "010" (e.g., 2), the spatial resolution layer is "11" (e.g., 3), and the temporal layer is "01" (e.g., 1). In some cases, these values may act as indexes into a mapping table, which may map the indexes to actual values for the corresponding dimensions. Accordingly, video decoder 30 may further determine actual values from the indexes using the mapping table.

In this manner, video decoder 30 of FIG. 3 represents an example of a video decoder configured to code, for a bitstream, information representative of which of a plurality of video coding dimensions are enabled for the bitstream, and to code values for syntax elements representative of the enabled video coding dimensions, without coding values for syntax elements representative of the video coding dimensions that are not enabled, in a network abstraction layer (NAL) unit header of a NAL unit comprising video data coded according to the values for each of the enabled video coding dimensions.

Figure 4:
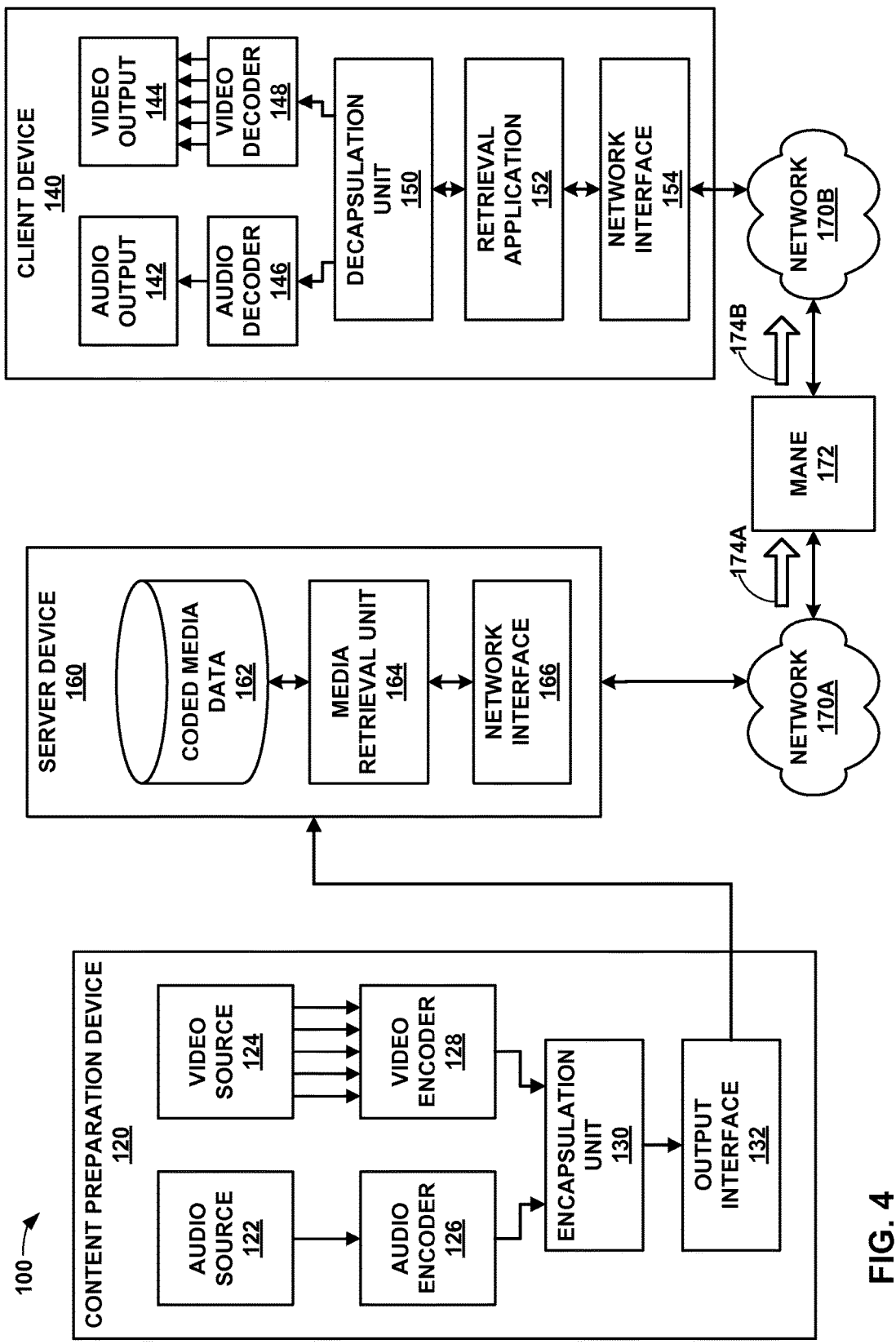
FIG. 4 is a block diagram illustrating a system including another set of devices that may perform the techniques of this disclosure for signaling characteristics of scalable dimensions for video data.

FIG. 4 is a block diagram illustrating a system 100 including another set of devices that may perform the techniques of this disclosure for signaling characteristics of scalable dimensions for video data. System 100 includes content preparation device 120, server device 160, client device 140, and media aware network element (MANE) 172. In some examples, content preparation device 120 and server device 160 may correspond to the same device, but are shown separately for purposes of explanation in FIG. 4. In this example, content preparation device 120 includes audio source 122, video source 124, audio encoder 126, video encoder 128, encapsulation unit 130, and output interface 132. Video source 124 may correspond substantially to video source 18 (FIG. 1), while video encoder 128 may correspond substantially to video encoder 20 (FIGS. 1 and 2).

Network 170A and network 170B represent networks of one or more devices for network communications. In general, networks 170A, 170B include one or more network devices, such as routers, hubs, switches, gateways, firewalls, or the like, for transmitting network communication data. In some examples, network 170A and network 170B may represent the same network, e.g., the Internet. In other examples, network 170A and network 170B may represent different networks. For example, network 170A may represent the Internet and network 170B may represent a content delivery network. In this example, MANE 172 is present between networks 170A and network 170B. MANE 172 may be configured to recognize and process media data in network communications passing through MANE 172 between network 170A and network 170B.

In general, audio source 122 and video source 124 may provide audio and video data, respectively, that corresponds to each other. For example, audio source 122 may comprise a microphone and video source 124 may comprise a video camera, and audio source 122 may capture audio data at substantially the same time that video source 124 captures video data. Alternatively, audio source 122 and video source 124 may correspond to computer generation sources that generate audio and video data, respectively. In any case, content preparation device 120 may provide syntax data, e.g., timestamps, that indicates audio data and video data that correspond to each other, that is, that are to be played back substantially simultaneously together. Audio encoder 126 may encode audio data received from audio source 122 using any of a variety of audio coding techniques, and provide the encoded audio data to encapsulation unit 130. Likewise, video encoder 128 may provide coded video data to encapsulation unit 130. The encoded video data may include data for one or more various scalable dimensions.

In this example, encapsulation unit 130 may perform various techniques of this disclosure related to coding NAL unit headers including data for one or more scalable dimensions. For example, encapsulation unit 130 may encapsulate coded slices of video data from video encoder 128 into NAL units. Moreover, encapsulation unit 130 may determine values for one or more scalable dimensions for each of the NAL units, and generate NAL unit headers including data representative of these values. Furthermore, encapsulation unit 130 may generate high level syntax data, such as a dimension range parameter set or a NAL unit header map parameter set, that indicates which of a plurality of scalable dimensions are enabled for a bitstream including encapsulated audio and video data, and that indicates bits allocated within NAL unit headers assigned to each of the enabled scalable dimensions. Encapsulation unit 130 may also encapsulate encoded audio data received from audio encoder 126. Encapsulation unit 130 may further encapsulate NAL units including audio or video data into respective access units.

After encapsulating audio and video data, encapsulation unit 130 may provide the encapsulated data to output interface 132. Output interface 132 may comprise a storage interface, a network interface, or other interface for outputting data. The data provided by output interface 132 may be delivered to server device 160, stored as coded media data 162. Server device 160 also includes media retrieval unit 164, for retrieving portions of coded media data 162, e.g., in response to network requests received from client device 140. Network interface 166, in this example, provides requested media data to client device 140 via network 170A. Network interface 166 may comprise a wired or wireless network interface.

Client device 140 includes network interface 154, retrieval application 152, decapsulation unit 150, audio decoder 146, video decoder 148, audio output 142, and video output 144. Audio output 142 may comprise one or more speakers, and video output 144 may comprise one or more displays, which may be configured to display three-dimensional video data. For example, video output 144 may comprise one or more stereoscopic or autostereoscopic displays. Audio output 142 may be capable of various types of audio output as well. For example, audio output 142 may include speakers in various combinations (e.g., two speaker stereo, four or more speaker surround sound, with or without a center speaker, and/or with or without a subwoofer). In this manner, audio output 142 and video output 144 may have various output characteristics. Video output 144, for example, may have various rendering characteristics.

Audio decoder 146 may generally decode encoded audio data, while video decoder 148 may generally decode encoded video data. Client device 140 may coordinate decoding processes between audio decoder 146 and video decoder 148 such that audio data and video data that are to be presented substantially simultaneously are available for presentation by audio output 142 and video output 144. Audio decoder 146 may have certain decoding capabilities, while video decoder 148 may have certain decoding capabilities (that is, certain decoding characteristics). For example, video decoder 148 may conform to a particular video coding standard, or a particular profile or level of a profile of a video coding standard. That is, video decoder 148 may be capable of using certain video coding techniques but not capable of using other video coding techniques.

In general, network interface 154 receives media data via network 170B and provides received data to retrieval application 152. Retrieval application 152 may comprise, for example, a web browser configured to retrieve and process media data, e.g., in accordance with dynamic adaptive streaming over HTTP (DASH). Retrieval application 152 may be configured with information defining decoding and rendering capabilities of audio decoder 146, video decoder 148, audio output 142, and video output 144, respectively. Accordingly, retrieval application 152 may select media data based on the capabilities of audio decoder 146, video decoder 148, audio output 142, and video output 144. For example, if video output 144 is only capable of stereoscopic video display, retrieval application 152 may avoid retrieving media data having more than two views. In this manner, retrieval application 152 may avoid retrieving data that is not usable, e.g., media data having more than two views, which may conserve scarce bandwidth resources and avoid unnecessary parsing and decoding of a bitstream including more than two views.

In order to obtain such a bitstream, retrieval application 152 may provide data to MANE 172 indicating characteristics of audio decoder 146, video decoder 148, audio output 142, and video output 144. Continuing the example above, retrieval application 152 may submit data to MANE 172 indicating that video output 144 is only capable of outputting stereoscopic video data. Accordingly, if MANE 172 receives a bitstream requested by client device 140, and the bitstream includes more than two views, MANE 172 may extract a sub-bitstream having only two views for client device 140.

In other words, during a sub-bitstream extraction process, some NAL units with a certain range of values in a dimension might be filtered out, e.g., by MANE 172. Therefore, as discussed above, MANE 172 may generate a new dimension range parameter set (or a new NAL unit header parameter set), represented by data structure 174B, including adjusted numbers of bits for some dimensions. With respect to the example of the dimension range parameter set, the dim_cnt_table as well as the dim_index_2_value_table may also be adjusted relative to the original dimension range parameter set. Moreover, the real non-empty syntax elements grouped into the nalUnitScalableCharSet might be changed, or the number of bits used to represent specific elements might be reduced.

Moreover, in accordance with the techniques of this disclosure, MANE 172 may receive a data structure 174A describing enabled scalable dimensions for a particular bitstream. Suppose, for example, that data structure 174A indicates, among other scalable dimensions, that a view dimension is enabled, and moreover, that data for eight views are present in the bitstream. However, continuing the example above, client device 140 may only be capable of stereoscopic video display. Accordingly, MANE 172 may extract a sub-bitstream having only two views. Moreover, MANE 172 may modify data structure 174A to form a modified data structure 174B indicative of characteristics of the extracted sub-bitstream.

For example, if the two views of an extracted sub-bitstream have view indexes "2" and "6," MANE 172 may adjust the view indexes to instead have values of "0" and "1," respectively. If a mapping table is provided in data structure 174A, MANE 172 may further adjust the mapping table to map the new index values to appropriate view identifiers (or other data for other scalable dimensions). Furthermore, for NAL units of the sub-bitstream, MANE 172 may revise NAL unit headers such that the NAL unit headers are shorter (that is, include fewer bits) than the original NAL unit headers of the full bitstream, e.g., by removing unnecessary bits for scalable dimensions that have reduced ranges relative to the full bitstream or by removing signaling data from NAL unit headers entirely for scalable dimensions that are not enabled for the extracted sub-bitstream.

After creating modified data structure 174B and extracting the sub-bitstream, MANE 172 may provide modified data structure 174B and the extracted sub-bitstream to client device 140 via network 170B. Client device 140 may receive modified data structure 174B and the extracted sub-bitstream via network interface 154, which may comprise a wired or wireless network interface.

In this manner, MANE 172 represents an example of a device configured to extract a sub-bitstream of a bitstream, wherein the bitstream comprises a first NAL unit and wherein the sub-bitstream comprises a second NAL unit including at least a portion of the video data of the first NAL unit, code, for the sub-bitstream, information representative of which of a plurality of video coding dimensions are enabled for the sub-bitstream, and code values for each of the enabled video coding dimensions for the sub-bitstream, without coding values for the video coding dimensions that are not enabled, in a revised NAL unit header of the second NAL unit, wherein the revised NAL unit header has a bit length that is shorter than a bit length of the NAL unit header of the first NAL unit.

MANE 172 may include a control unit configured to perform these techniques. The control unit may be implemented in hardware, software, firmware, or any combination thereof. When implemented in software and/or firmware, it is presumed that requisite hardware, such as one or more processors and memory for storing instructions that can be executed by the one or more processors, are also provided. Likewise, the elements of content preparation device 120, server device 160, and client device 140 may also be implemented in hardware, software, firmware, or any combination thereof, again assuming that requisite hardware is provided to execute the software or firmware, if used.

Figure 5A:
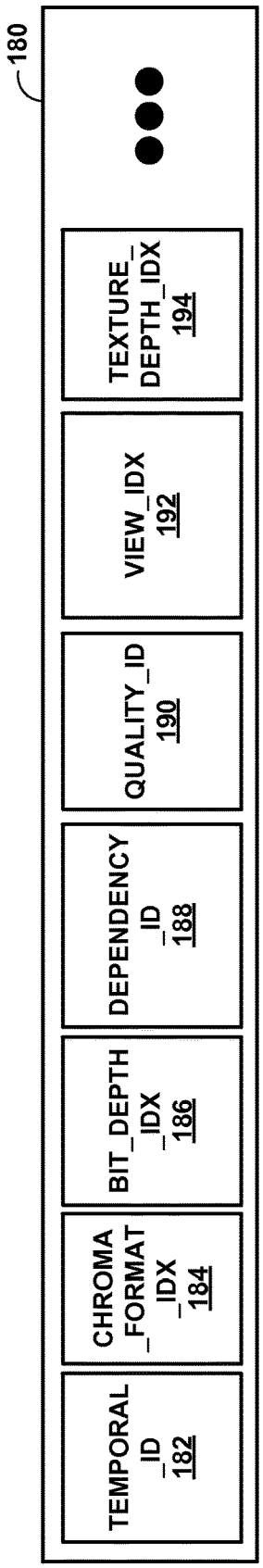
FIGS. 5A and 5B are conceptual diagrams illustrating examples of NAL unit headers in accordance with various examples of the techniques of this disclosure.
Figure 5B:
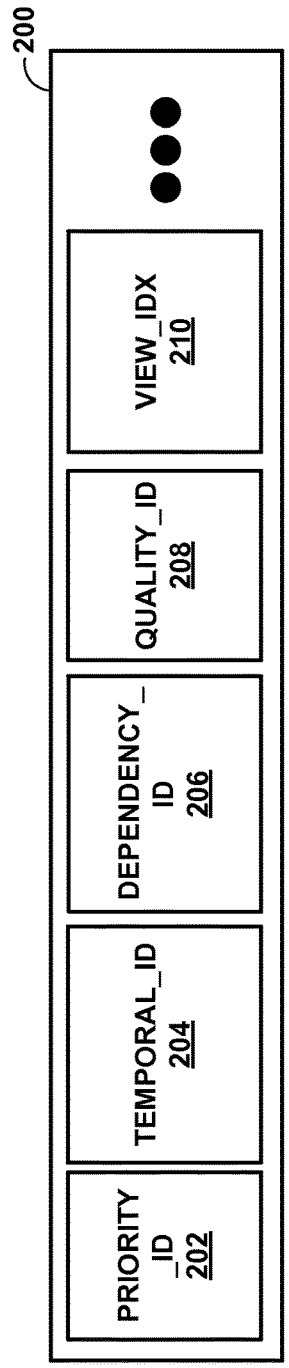

FIGS. 5A and 5B are conceptual diagrams illustrating examples of NAL unit headers in accordance with various examples of the techniques of this disclosure. FIGS. 5A and 5B generally represent examples of a set of scalability or view dimension identifiers (that is, identifiers for scalable dimensions) that may be included in a NAL unit header. FIG. 5A illustrates an example NAL unit header 180 including temporal_id 182, chroma_format_idx 184, bit_depth_idx 186, dependency_id 188, quality_id 190, view_idx 192, and texture_depth_idx 194. In general, values for any or all of temporal_id 182, chroma_format_idx 184, bit_depth_idx 186, dependency_id 188, quality_id 190, view_idx 192, and texture_depth_idx 194 may be signaled, based on whether corresponding dimensions are enabled as being scalable or not.

Furthermore, a number of bits allocated to any or all of temporal_id 182, chroma_format_idx 184, bit_depth_idx 186, dependency_id 188, quality_id 190, view_idx 192, and texture_depth_idx 194 may be indicated in a dimension range parameter set, e.g., in accordance with Table 1 as discussed above. In this manner, NAL unit header 180 represents an example of a NAL unit header constructed in accordance with the dimension range parameter set of Table 1. Accordingly, values for temporal_id 182, chroma_format_idx 184, bit_depth_idx 186, dependency_id 188, quality_id 190, view_idx 192, and texture_depth_idx 194 may be assigned, when present, based on the intersection of these various dimensions to which the NAL unit encapsulated by NAL unit header 180 corresponds. For scalable dimensions that are not enabled (that is, scalable dimensions that have only one possible value in the bitstream), data need not be signaled in the NAL unit header of NAL unit 180. For example, if there is only one bit depth for a bitstream, no data need be provided for bit_depth_idx 186.

FIG. 5B illustrates another example NAL unit header 200 including priority_id 202, temporal_id 204, dependency_id 206, quality_id 208, and view_idx 210. In this manner, NAL unit header 200 represents an example of a NAL unit header constructed according to the NAL unit header map parameter set of Table 8. NAL unit header 200 otherwise conforms substantially to NAL unit header 180. Of course, the syntax elements of NAL unit header 200 may be included in NAL unit header 180, and likewise, the syntax elements of NAL unit header 180 may be included in NAL unit header 200, in various examples, with appropriate revisions to the syntax and semantics of the tables above.

NAL unit headers may be designed for various different scenarios. Below several examples are provided. However, it should be understood that other examples may also be conceived and represented using the techniques of this disclosure.

In one example, a scalable video bitstream may have Quarter Video Graphics Array (QVGA) to Video Graphics Array (VGA) spatial scalability, while dependency layers have three temporal layers. In such a case, three bits may be used to signal the scalability and/or view dimensions in the NAL unit header. For instance, two bits may be assigned to represent temporal_id 204, one bit may be assigned to represent dependency_id 206, and no bits need be assigned to represent quality_ID 208 and view_IDX 210.

In another example, a stereoscopic bitstream may have two spatial layers for each view, and each of the views may have three temporal layers. In such a case, four bits may be used in total to represent the NAL unit header: two bits to represent temporal_id 204, one bit to represent dependency_id 188, one bit to represent view_idx 210, and zero bits to represent quality_id 208.

In another example, a multiview bitstream may include eight views, each with two quality layers. The bitstream may also be coded with a hierarchical B-prediction structure with a GOP size of 16 (that is, four temporal layers). In this example, seven total bits may be used to signal the scalability and/or view dimensions in the NAL unit header: three bits for temporal_id 204, zero bits for dependency_id 206, one bit for quality_id 208, and three bits for view_idx 210.

Figure 6:
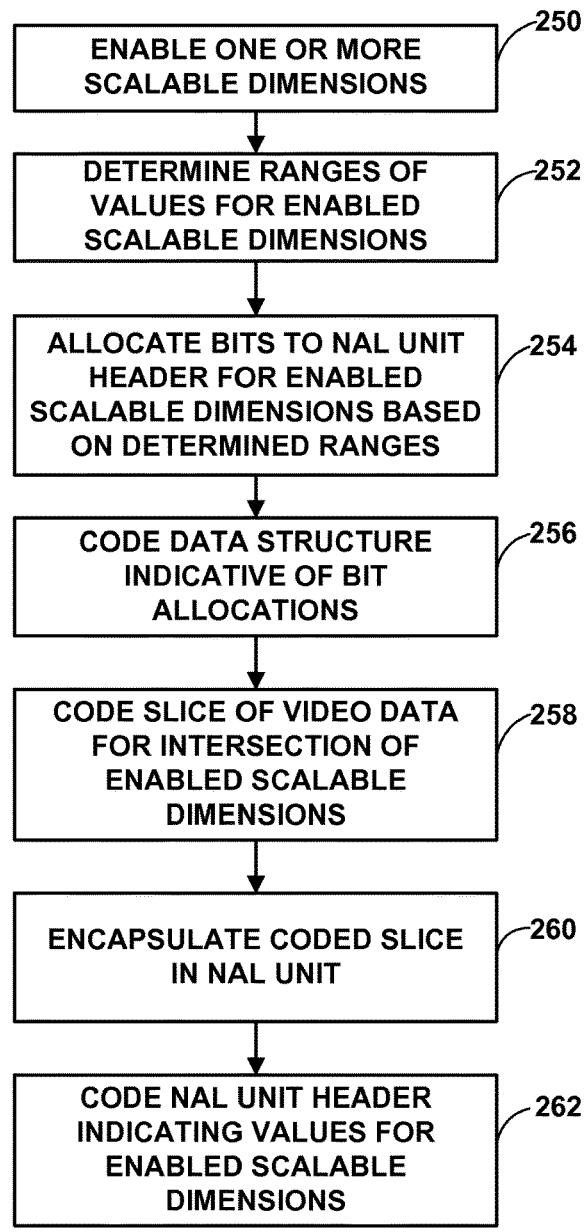
FIG. 6 is a flowchart illustrating an example method for signaling characteristics of scalable dimensions for video data.

FIG. 6 is a flowchart illustrating an example method for signaling characteristics of scalable dimensions for video data. The method of FIG. 6 is explained with respect to video encoder 20, for purposes of example. However, it should be understood that other devices, such as other units of source device 12 (FIG. 1) or components of content preparation device 120 and/or server device 160 (FIG. 4) may be configured to perform the method of FIG. 6. Likewise, MANE 172 (FIG. 4) may be configured to perform certain aspects of the method of FIG. 6. Moreover, it should be understood that certain steps of the method of FIG. 6 may be omitted or performed in a different sequential order, or in parallel, and other steps may be added.

In this example, video encoder 20 enables one or more scalable dimensions (250) for video data that is to be encoded and formed into a bitstream. For example, video encoder 20 may receive an indication from an external source (e.g., a user) that received video data is to be coded using one or more scalable dimensions, such as one or more of a priority dimension, a spatial resolution dimension, a temporal dimension, a quality dimension (e.g., a signal-to-noise ratio (SNR) dimension), a view dimension, a color bit depth dimension, a chroma sample format dimension, and/or a dependency dimension.

Video encoder 20 may then determine ranges of values for the enabled scalable dimensions (252). For example, video encoder 20 may determine a number of layers to be encoded for each dimension. As an example, if the received video data has V views, where V is an integer, video encoder 20 may determine that V values are needed in the range for the view dimension. As another example, if the spatial resolution dimension is enabled and there are to be three layers, one base layer and two enhancement layers, video encoder 20 may determine that three values are needed in the range for the spatial resolution dimension. In general, for each dimension, video encoder 20 may determine a range of values in the dimension for identifying layers (or views) within that dimension.

Video encoder 20 may then allocate bits to a NAL unit header for the enabled scalable dimensions based on the determined ranges (254). For example, let N be the number of enabled dimensions, and let $R_K$ represent the size of the range for dimension K where $1<=K<=N$. To calculate the number of bits needed to represent values for dimension K, video encoder 20 may calculate $\text{ceil}(\log_2(R_K))$. Thus, to calculate the total number of bits needed in the NAL unit header for the enabled scalable dimensions based on the determined ranges, video encoder 20 may calculate $$\sum_{K=1}^{N} \text{ceil}(\log_2(R_K)),$$

where ceil(X) returns the value of X rounded up to the highest integer equal to or greater than X. That is, if X is an integer, ceil(X) returns X, whereas if X is a rational number that is not an integer expressed as A·B, ceil(X) returns (A+1). In this manner, the sum of these values may represent the total number of bits to be used in the NAL unit header of the enabled dimensions, based on the determined ranges of values for each dimension.

Video encoder 20 may then code a data structure indicative of the bit allocations for the NAL unit header (256). For example, video encoder 20 may code a dimension range parameter set in accordance with Table 1 or a NAL unit header map in accordance with Table 8, as described above. The data structure may form its own independent data structure or be included in another data structure, such as a sequence parameter set (SPS). In any case, the data structure may generally indicate a number of bits in the NAL unit header for each of the enabled dimensions. Furthermore, when the data structure allocates zero bits to a particular dimension in the NAL unit header, the dimension may be determined as being non-enabled for scalability. In other words, a dimension for which zero bits are allocated in the NAL unit header may not be scalable for the corresponding bitstream. In this manner, the data structure also provides an indication of which of the scalable dimensions are enabled for scalability.

In some examples, values for layers of a dimension may not increment atomically by one. For example, view identifiers (view_ids) for a view dimension do not necessarily increase by a value of one. As another example, bit depth values, e.g., for color bit depths, may include values of 8-bit, 10-bit, and 12-bit. Accordingly, when determining the range of values as discussed above, the range may include a range of index values for the actual values of levels in the dimension. The index values may then be mapped to the actual values by a mapping table, which may be included in the data structure coded above or be provided as a separate data structure. The mapping table may correspond to the syntax and semantics of any or all of Table 3, Table 5, Table 9, Table 10, or Table 13, alone or in any combination, where combinations of these tables may be signaled as one table or a plurality of separate tables.

Video encoder 20 may then code a slice of video data for an intersection of the enabled scalable dimensions (258). For example, if video encoder 20 enabled a view dimension, a spatial resolution dimension, and a temporal dimension, video encoder 20 may begin coding a slice of a base view, a base layer for the spatial resolution dimension, and having a temporal identifier of zero. In general, the slice coded in step 258 may represent any arbitrarily selected slice of the bitstream. Coding of the slice generally involves coding the slice based on the enabled dimensions. Thus, if the view dimension is enabled for scalability, and the slice is a non-base view, video encoder 20 may code the slice using inter-view prediction. As another example, if spatial resolution scalability is enabled, and the slice is a non-base layer, video encoder 20 may code the slice using inter-layer prediction. When multiple scalable dimensions are enabled, video encoder 20 may code the slice using inter-layer prediction for any or all of the enabled scalable dimensions, for any of the dimensions for which the slice does not occur at a base layer (or base view).

Video encoder 20 may then encapsulate the coded slice in a NAL unit (260). In particular, video encoder 20 may code a NAL unit header for the slice that indicates values for the enabled scalable dimensions for the slice (262). In particular, video encoder 20 determines bit values for the NAL unit header based on which of the layers or views of each scalable dimension the coded slice corresponds to. For example, if a view dimension and a spatial resolution dimension are enabled, there are eight views and three spatial resolution layers, and the recently coded slice corresponds to the view for which a view index "010" is assigned and a spatial resolution layer for which a spatial resolution index "11" is assigned, video encoder 20 may code "01011" in the NAL unit header to indicate values for the enabled scalable dimensions.

In this manner, the method of FIG. 6 represents an example of a method including coding, for a bitstream, information representative of which of a plurality of video coding dimensions are enabled for the bitstream, and coding values for syntax elements representative of the enabled video coding dimensions, without coding values for syntax elements representative of the video coding dimensions that are not enabled, in a network abstraction layer (NAL) unit header of a NAL unit comprising video data coded according to the values for each of the enabled video coding dimensions.

Figure 7:
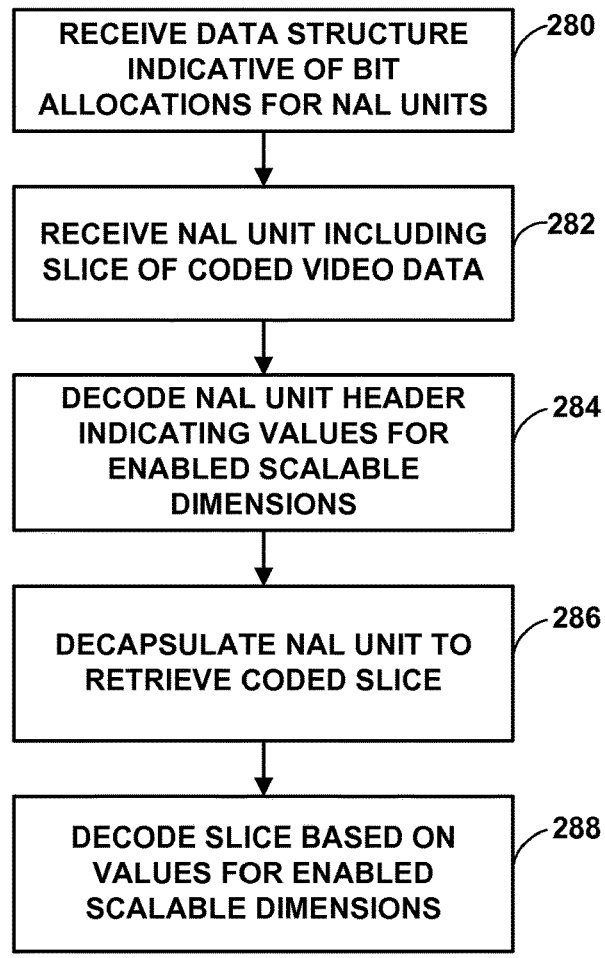
FIG. 7 is a flowchart illustrating an example method for using signaled characteristics of scalable dimensions for video data.

FIG. 7 is a flowchart illustrating an example method for using signaled characteristics of scalable dimensions for video data. The method of FIG. 7 is explained with respect to video decoder 30, for purposes of example. However, it should be understood that other devices, such as other units of destination device 14 (FIG. 1) or components of server device 160 or client device 140 (FIG. 4) may be configured to perform the method of FIG. 7. Likewise, MANE 172 (FIG. 4) may be configured to perform certain aspects of the method of FIG. 7. Moreover, it should be understood that certain steps of the method of FIG. 7 may be omitted or performed in a different sequential order, or in parallel, and other steps may be added.

In this example, video decoder 30 receives a data structure indicative of bit allocations for NAL units of a bitstream (280). For example, video decoder 30 may receive a dimension range parameter set or a NAL unit header map parameter set, which may be signaled as independent data structures or signaled within another data structure, such as a sequence parameter set. In addition, video decoder 30 may also receive a mapping table, such as an index to value mapping table, that maps index values to actual values for scalable dimensions.

In general, the bit allocations for NAL units signaled in the data structure may provide an indication of which of a plurality of scalable dimensions are enabled for the bitstream. That is, video decoder 30 may that determine scalable dimensions for which one or more bits are allocated in the NAL unit header are enabled for scalability. Video decoder 30 may determine that other dimensions, for which zero bits are allocated in the NAL unit header, are not enabled. Accordingly, video decoder 30 may infer default values for non-enabled scalable dimensions for NAL units in the bitstream.

Video decoder 30 may then receive a NAL unit including a slice of coded video data (282). This NAL unit may represent any arbitrary NAL unit of the bitstream. Video decoder 30 may decode the NAL unit header that indicates values for enabled scalable dimensions (284). That is, video decoder 30 may use the data structure indicative of the bit allocations for the NAL unit header to interpret the values of the NAL unit header of the received NAL unit. Moreover, if a mapping table was received, video decoder 30 may use the mapping table to further interpret index values in the NAL unit header to actual values for the corresponding scalable dimension.

Video decoder 30 may then decapsulate the NAL unit to retrieve a coded slice from the NAL u nit (286). Video decoder 30 may then decode the slice based on the values for the enabled scalable dimensions, as determined from the NAL unit header (288). Decoding the slice based on these values may include, for example, determining which layer (or view) of each enabled scalable dimension the slice corresponds to, and decoding the slice using inter-layer prediction, if needed. Moreover, different sets of syntax data may be signaled for a slice depending on whether inter-layer prediction is available for one or more of the various scalable dimensions. For example, if the slice corresponds to a base layer of a particular scalable dimension, video decoder 30 may be configured not to receive syntax elements indicative of a reference layer for inter-layer prediction for the corresponding scalable dimension.

In this manner, the method of FIG. 7 also represents an example of a method including coding, for a bitstream, information representative of which of a plurality of video coding dimensions are enabled for the bitstream, and coding values for syntax elements representative of the enabled video coding dimensions, without coding values for syntax elements representative of the video coding dimensions that are not enabled, in a network abstraction layer (NAL) unit header of a NAL unit comprising video data coded according to the values for each of the enabled video coding dimensions.

Figure 8:
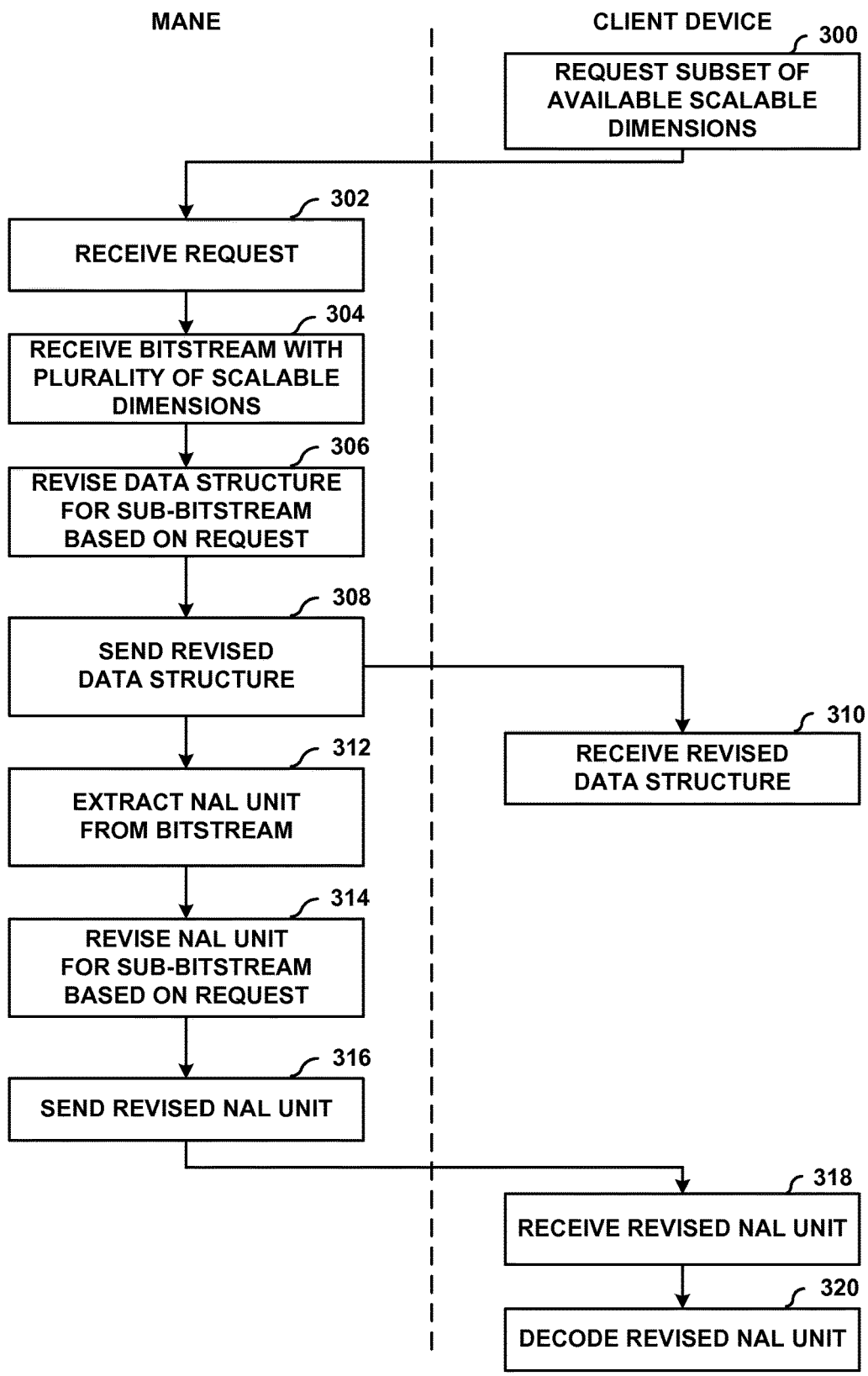
FIG. 8 is a flowchart illustrating another example method for signaling characteristics, and for using signaled characteristics, of scalable dimensions for video data.

FIG. 8 is a flowchart illustrating another example method for signaling characteristics, and for using signaled characteristics, of scalable dimensions for video data. The example of FIG. 8 is described with respect to a MANE (e.g., MANE 172 of FIG. 4) and a client device (e.g., client device 140 of FIG. 4). It should be understood that other devices may be configured to perform the various steps of the method of FIG. 8. Moreover, the steps may be performed in different orders, or in parallel, and certain steps may be omitted while other steps may be added.

In this example, client device 140 initially requests video data having a subset of available scalable dimensions enabled (300). This request may be based on coding and rendering capabilities of client device 140, e.g., of video decoder 148 and video output 144. The request may represent an indication of supported coding and rendering capabilities, and not necessarily an explicit request for a particular set of enabled scalable dimensions for a particular bitstream.

MANE 172 may receive the request (302) and receive a bitstream with a plurality of scalable dimensions (304), e.g., from server device 160. Receiving the bitstream may correspond to receiving a portion of the bitstream, and not necessarily the entire bitstream, at this step. The bitstream may include a data structure indicative of the enabled scalable dimensions for the bitstream, as well as bit allocations for values signaled in NAL unit headers for the enabled scalable dimensions. Again, reception of this data structure by MANE 172 is represented by arrow 174A in FIG. 4. MANE 172 may then revise the data structure based on a sub-bitstream that is to be extracted based on the request received from client device 140 (306). MANE 172 may further revise a mapping table, if a mapping table is provided.

For example, if the bitstream includes eight views, but client device 140 only supports stereoscopic 3D playback, MANE 172 may determine that a sub-bitstream to be extracted should only include two views, rather than all eight. If the original data structure allocated three bits to the NAL unit header to identify a view to which a particular NAL unit corresponds, MANE 172 may instead allocate only one bit in the NAL unit header for the view identifier (or view index). In addition, if a mapping table mapped view indexes to view identifiers, MANE 172 may revise the mapping table to reflect a mapping of only the two views to be included in the extracted sub-bitstream.

MANE 172 may then send the revised data structure to client device 140 (308). Again, sending the revised data structure to client device 140 is represented by arrow 174B in FIG. 4. Client device 140 may receive the revised data structure, in turn (310).

Subsequently, MANE 172 may extract a NAL unit from the bitstream (312). The extracted NAL unit may have values for all of the enabled scalable dimensions. However, MANE 172 may revise the NAL unit for the sub-bitstream to be sent to client device 140 based on the request (314). For example, MANE 172 may remove data from the NAL unit header indicative of values for scalable dimensions that are not supported by client device 140. MANE 172 need not sent NAL units of layers of scalable dimensions that are not supported, or not needed, by client device 140 to client device 140. Instead, MANE 172 may extract only those NAL units including data requested by client device 140, and revise the NAL unit headers as necessary.

As an example, if the original bitstream included data for eight views, but client device 140 requested only two views, MANE 172 may extract only NAL units corresponding to the two views that are to be sent to client device 140. Furthermore, MANE 172 may revise NAL unit headers to reflect a change in view identifiers (or view indexes) for these NAL units. Suppose, for example, that the original NAL units of the two views selected for client device 140 included view index values of "010" and "110." MANE 172 may change these values to "0" and "1," respectively, based on the bit allocations of the revised data structure and based on the revised mapping table.

MANE 172 may then send the revised NAL unit to client device 140 (316). Client device 140, in turn, may receive the revised NAL unit (318) and decode the revised NAL unit (320). Decoding the revised NAL unit may generally correspond to the process described in FIG. 7. Thus, from the perspective of client device 140, processing a sub-bitstream need not be different than processing a bitstream generally, in accordance with the techniques of this disclosure.

In this manner, the method of FIG. 8 also represents an example of a method including coding, for a bitstream, information representative of which of a plurality of video coding dimensions are enabled for the bitstream, and coding values for syntax elements representative of the enabled video coding dimensions, without coding values for syntax elements representative of the video coding dimensions that are not enabled, in a network abstraction layer (NAL) unit header of a NAL unit comprising video data coded according to the values for each of the enabled video coding dimensions. MANE 172 and client device 140 both represent devices that code such information and values.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   coding, for a bitstream, information representative of which of a plurality of video coding dimensions are enabled for the bitstream, the information indicating that at least one of the plurality of video coding dimensions is not enabled for the bitstream;
   coding a network abstraction layer (NAL) unit header for a NAL unit for a picture comprising video data representing an intersection of the enabled video coding dimensions, comprising coding values for syntax elements representative of the enabled video coding dimensions, without coding values for syntax elements representative of the video coding dimensions that are not enabled, in the NAL unit header of the NAL unit, such that the NAL unit header includes a number of bits corresponding to the enabled video coding dimensions and does not include any bits corresponding to the video coding dimensions that are not enabled, wherein the number of bits is less than a maximum possible number of bits for the plurality of video coding dimensions, the maximum possible number of bits including a sum of numbers of bits for syntax elements of each of the plurality of video coding dimensions, wherein the plurality of video coding dimensions comprises a plurality of scalable video coding dimensions, wherein the plurality of scalable video coding dimensions comprises one or more of a spatial dimension, a temporal dimension, a view dimension, a color bit depth dimension, a chrominance (chroma) sample format dimension, or a dependency dimension, and wherein coding the values for each of the enabled video coding dimensions comprises:
      determining, for each of the enabled video coding dimensions, a respective number of bits for the syntax elements used to code the respective values; and
      coding the values for the syntax elements of the enabled video coding dimensions based on the determined respective numbers of bits, comprising abstaining from coding any bits of syntax elements representative of the video coding dimensions that are not enabled.

2. The method of claim 1, further comprising, for all video data of the bitstream, inferring default values for the video coding dimensions that are not enabled.

3. The method of claim 1, wherein the plurality of scalable video coding dimensions further comprises one or more of a priority dimension a signal-to-noise ratio (SNR) dimension, or a quality dimension.

4. The method of claim 1, wherein coding the information representative of which of the plurality of video coding dimensions are enabled comprises coding a dimension range parameter set.

5. The method of claim 4, further comprising coding a value for a dimension range parameter set identifier element of a sequence parameter set to correspond to the dimension range parameter set.

6. The method of claim 1, wherein coding the information representative of which of the plurality of video coding dimensions are enabled comprises coding a NAL unit header map.

7. The method of claim 1, further comprising coding information representative of a correspondence between bits in the NAL unit header and the enabled video coding dimensions.

8. The method of claim 1, wherein the values for one or more of the enabled video coding dimensions comprise index values into respective sets of possible values for the respective enabled video coding dimensions, the method further comprising determining mappings between each of the index values and one of the values of the respective sets to which the respective index values are mapped.

9. The method of claim 8, further comprising coding an index to value mapping table including information defining the mappings for the one or more of the enabled video coding dimensions for which the values comprise index values.

10. The method of claim 8, wherein one of the enabled video coding dimensions comprises a view dimension, wherein coding the index values comprises coding, in the NAL unit header, a view order index value for the view dimension, and wherein determining the mappings comprises determining a mapping between the view order index value and a view identifier (view_id) value for the view dimension.

11. The method of claim 8, wherein determining the mappings comprises determining the mappings from predefined configuration data for a video coder.

12. The method of claim 1, further comprising coding the video data of the NAL unit based on the values for each of the enabled video coding dimensions.

13. The method of claim 12, wherein coding the video data comprises decoding the video data based on the values for each of the enabled video coding dimensions.

14. The method of claim 12, wherein coding the video data comprises encoding the video data based on the values for each of the enabled video coding dimensions.

15. A device for coding video data, the device comprising:
    a memory configured to store video data; and
    a video coder configured to:
       code, for a bitstream including the video data, information representative of which of a plurality of video coding dimensions are enabled for the bitstream, the information indicating that at least one of the plurality of video coding dimensions is not enabled for the bitstream, and
       code a network abstraction layer (NAL) unit header for a NAL unit for a picture comprising video data representing an intersection of the enabled video coding dimensions, wherein the video coder is configured to code values for syntax elements representative of the enabled video coding dimensions, without coding values for syntax elements representative of the video coding dimensions that are not enabled, in the NAL unit header of the NAL unit, such that the NAL unit header includes a number of bits corresponding to the enabled video coding dimensions and does not include any bits corresponding to the video coding dimensions that are not enabled, wherein the number of bits is less than a maximum possible number of bits, the maximum possible number of bits being equal to a sum of numbers of bits for syntax elements of each of the plurality of video coding dimensions, wherein the plurality of video coding dimensions comprises a plurality of scalable video coding dimensions, wherein the plurality of scalable video coding dimensions comprises one or more of a spatial dimension, a temporal dimension, a view dimension, a color bit depth dimension, a chrominance (chroma) sample format dimension, or a dependency dimension, and wherein to code the values for each of the enabled video coding dimensions, the video coder is configured to determine, for each of the enabled video coding dimensions, a respective number of bits used to represent the respective values, and code the values for each of the enabled video coding dimensions based on the determined respective numbers of bits, wherein the video coder is configured to abstain from coding any bits of syntax elements representative of the video coding dimensions that are not enabled.

16. The device of claim 15, wherein the plurality of scalable video coding dimensions further comprises one or more of a priority dimension a signal-to-noise ratio (SNR) dimension, or a quality dimension.

17. The device of claim 15, wherein to code the information representative of which of the plurality of video coding dimensions are enabled, the video coder is configured to code a dimension range parameter set.

18. The device of claim 15, wherein to code the information representative of which of the plurality of video coding dimensions are enabled, the video coder is configured to code a NAL unit header map.

19. The device of claim 18, wherein to code the NAL unit header map, the video coder is configured to code at least one of a NAL unit header map parameter set (NPS) comprising data for the NAL unit header map and a sequence parameter set (SPS) comprising data for the NAL unit header map.

20. The device of claim 15, wherein the video coder is configured to, for all video data of the bitstream, infer default values for the video coding dimensions that are not enabled.

21. The device of claim 15, wherein the values for one or more of the enabled video coding dimensions comprise index values into respective sets of possible values for the respective enabled video coding dimensions, and wherein the video coder is configured to determine mappings between each of the index values and one of the values of the respective sets to which the respective index values are mapped.

22. The device of claim 21, wherein the video coder is further configured to code an index to value mapping table including information defining the mappings for the one or more of the enabled video coding dimensions for which the values comprise index values.

23. The device of claim 21, wherein one of the enabled video coding dimensions comprises a view dimension, wherein to code the index values, the video coder is configured to code, in the NAL unit header, a view order index value for the view dimension, and wherein to determine the mappings, the video coder is configured to determine a mapping between the view order index value and a view identifier (view_id) value for the view dimension.

24. The device of claim 15, wherein the video coder is further configured to code the video data of the NAL unit based on the values for each of the enabled video coding dimensions.

25. The device of claim 24, wherein the video coder comprises a video decoder.

26. The device of claim 24, wherein the video coder comprises a video encoder.

27. The device of claim 15, wherein the device comprises at least one of:
    an integrated circuit that includes the video coder and is configured to code the video data;
    a microprocessor that includes the video coder and is configured to code the video data; or
    a wireless communication device that includes the video coder and is configured to code the video data.

28. A device for coding video data, the device comprising:
    means for coding, for a bitstream, information representative of which of a plurality of video coding dimensions are enabled for the bitstream, the information indicating that at least one of the plurality of video coding dimensions is not enabled for the bitstream; and
    means for coding a network abstraction layer (NAL) unit header for a NAL unit for a picture comprising video data representing an intersection of the enabled video coding dimensions, comprising means for coding values for syntax elements representative of the enabled video coding dimensions, without coding values for syntax elements representative of the video coding dimensions that are not enabled, in the NAL unit header of the NAL unit, such that the NAL unit header includes a number of bits corresponding to the enabled video coding dimensions and does not include any bits corresponding to the video coding dimensions that are not enabled, wherein the number of bits is less than a maximum possible number of bits, the maximum possible number of bits being equal to a sum of numbers of bits for syntax elements of each of the plurality of video coding dimensions, wherein the plurality of video coding dimensions comprises a plurality of scalable video coding dimensions, wherein the plurality of scalable video coding dimensions comprises one or more of a spatial dimension, a temporal dimension, a view dimension, a color bit depth dimension, a chrominance (chroma) sample format dimension, or a dependency dimension, and wherein the means for coding the values for each of the enabled video coding dimensions comprises:
    means for determining, for each of the enabled video coding dimensions, a respective number of bits used to represent the respective values; and
    means for coding the values for each of the enabled video coding dimensions based on the determined respective numbers of bits, comprising means for abstaining from coding any bits of syntax elements representative of the video coding dimensions that are not enabled.

29. The device of claim 28, wherein the plurality of scalable video coding dimensions further comprises one or more of a priority dimension a signal-to-noise ratio (SNR) dimension, or a quality dimension.

30. The device of claim 28, wherein the means for coding the information representative of which of the plurality of video coding dimensions are enabled comprise means for coding at least one of a dimension range parameter set and a NAL unit header map.

31. The device of claim 28, wherein the values for one or more of the enabled video coding dimensions comprise index values into respective sets of possible values for the respective enabled video coding dimensions, further comprising:
   means for determining mappings between each of the index values and one of the values of the respective sets to which the respective index values are mapped; and
   means for coding an index to value mapping table including information defining the mappings for each of the enabled video coding dimensions for which the values comprise index values.

32. The device of claim 31, wherein one of the enabled video coding dimensions comprises a view dimension, wherein the means for coding the index values comprises means for coding, in the NAL unit header, a view order index value for the view dimension, and wherein the means for determining the mappings comprises means for determining a mapping between the view order index value and a view identifier (view_id) value for the view dimension.

33. The device of claim 28, further comprising means for coding the video data of the NAL unit based on the values for each of the enabled video coding dimensions.

34. The device of claim 33, wherein the means for coding the video data comprises means for decoding the video data based on the values for each of the enabled video coding dimensions.

35. The device of claim 33, wherein the means for coding the video data comprises means for encoding the video data based on the values for each of the enabled video coding dimensions.

36. A non-transitory computer-readable storage medium having stored thereon instructions that, when executed, cause a processor to:
   code, for a bitstream, information representative of which of a plurality of video coding dimensions are enabled for the bitstream, the information indicating that at least one of the plurality of video coding dimensions is not enabled for the bitstream; and
   code a network abstraction layer (NAL) unit header for a NAL unit for a picture comprising video data representing an intersection of the enabled video coding dimensions, comprising instructions that cause the processor to code values for syntax elements representative of the enabled video coding dimensions, without coding values for syntax elements representative of the video coding dimensions that are not enabled, in the NAL unit header of the NAL unit, such that the NAL unit header includes a number of bits corresponding to the enabled video coding dimensions and does not include any bits corresponding to the video coding dimensions that are not enabled, wherein the number of bits is less than a maximum possible number of bits, the maximum possible number of bits being equal to a sum of numbers of bits for syntax elements of each of the plurality of video coding dimensions, wherein the plurality of video coding dimensions comprises a plurality of scalable video coding dimensions, wherein the plurality of scalable video coding dimensions comprises one or more of a spatial dimension, a temporal dimension, a view dimension, a color bit depth dimension, a chrominance (chroma) sample format dimension, or a dependency dimension, and wherein the instructions that cause the processor to code the values for each of the enabled video coding dimensions comprise instructions that cause the processor to:
   determine, for each of the enabled video coding dimensions, a respective number of bits for the syntax elements used to code the respective values; and
   code the values for the syntax elements of the enabled video coding dimensions based on the determined respective numbers of bits, comprising abstaining from coding any bits of syntax elements representative of the video coding dimensions that are not enabled.

37. The non-transitory computer-readable storage medium of claim 36, wherein the values for one or more of the enabled video coding dimensions comprise index values into respective sets of possible values for the respective enabled video coding dimensions, further comprising instructions that cause the processor to:
   determine mappings between each of the index values and one of the values of the respective sets to which the respective index values are mapped; and
   code an index to value mapping table including information defining the mappings for each of the enabled video coding dimensions for which the values comprise index values.

38. The non-transitory computer-readable storage medium of claim 36, further comprising instructions that cause the processor to code the video data of the NAL unit based on the values for each of the enabled video coding dimensions.

39. The non-transitory computer-readable storage medium of claim 38, wherein the instructions that cause the processor to code the video data comprise instructions that cause the processor to decode the video data based on the values for each of the enabled video coding dimensions.

40. The non-transitory computer-readable storage medium of claim 38, wherein the instructions that cause the processor to code the video data comprise instructions that cause the processor to encode the video data based on the values for each of the enabled video coding dimensions.

41. The method of claim 1, the method being executable on a wireless communication device, wherein the device comprises:
   a memory configured to store video data of the bitstream;
   a processor configured to execute instructions to process the video data stored in said memory; and
   a receiver configured to receive the bitstream.

42. The method of claim 41, wherein the wireless communication device is a cellular telephone and the bitstream is received by the receiver and modulated according to a cellular communication standard.

43. The device of claim 15, wherein the device is a wireless communication device, further comprising:
   a receiver configured to receive the bitstream.

44. The device of claim 43, wherein the wireless communication device is a cellular telephone and the bitstream is received by the receiver and modulated according to a cellular communication standard.

45. The method of claim 1, wherein coding the NAL unit header for the NAL unit comprises coding a plurality of NAL units, the plurality of NAL units corresponding to a common access unit, and wherein coding the plurality of NAL units comprises coding video data of the plurality of NAL units for each of the enabled video coding dimensions such that the plurality of NAL units includes NAL units for a number of pictures equal to a product of a number of layers in each of the enabled video coding dimensions, each of the pictures representing an intersection of each of the enabled video coding dimensions.

\* \* \* \* \*